(12) United States Patent
Lee et al.

(10) Patent No.: US 11,863,354 B2
(45) Date of Patent: Jan. 2, 2024

(54) MODEL TRANSFER WITHIN WIRELESS NETWORKS FOR CHANNEL ESTIMATION

(71) Applicant: Nokia Technologies Oy, Espoo (FI)

(72) Inventors: Gilsoo Lee, Naperville, IL (US); Athul Prasad, Naperville, IL (US); Amitabha Ghosh, Buffalo Grove, IL (US); Jie Chen, Naperville, IL (US); Jun Tan, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/318,850

(22) Filed: May 12, 2021

(65) Prior Publication Data

US 2022/0368570 A1 Nov. 17, 2022

(51) Int. Cl.
*H04L 25/02* (2006.01)
*H04W 92/18* (2009.01)

(52) U.S. Cl.
CPC ...... *H04L 25/0254* (2013.01); *H04L 25/0222* (2013.01); *H04W 92/18* (2013.01)

(58) Field of Classification Search
CPC . H04L 25/0254; H04L 25/0222; H04W 92/18
See application file for complete search history.

(56) References Cited

U.S. PATENT DOCUMENTS

| | | | |
|---|---|---|---|
| 2017/0279508 A1* | 9/2017 | Truong | H04B 7/0626 |
| 2019/0108445 A1 | 4/2019 | Huang et al. | |
| 2020/0134469 A1 | 4/2020 | Choo et al. | |
| 2020/0259545 A1* | 8/2020 | Bai | H04B 7/0695 |
| 2020/0313741 A1 | 10/2020 | Zhu et al. | |
| 2021/0243633 A1* | 8/2021 | Bao | H04L 5/0091 |

OTHER PUBLICATIONS

"3rd Generation Partnership Project; Technical Specification Group Radio Access Network; NR; Multiplexing and channel coding (Release 16)", 3GPP TS 38.212, V16.3.0, Sep. 2020, pp. 1-152.
Yang et al., "Deep Transfer Learning-Based Downlink Channel Prediction for FDD Massive MIMO Systems", IEEE Transactions on Communications, vol. 68, No. 12, Dec. 2020, pp. 7485-7497.
Godala et al., "A Deep Learning based Approach for 5G NR CSI Estimation", IEEE 3rd 5G World Forum (5GWF), Sep. 10-12, 2020, pp. 59-62.

(Continued)

*Primary Examiner* — Natasha W Cosme
(74) *Attorney, Agent, or Firm* — Brake Hughes Bellermann LLP

(57) ABSTRACT

A method includes receiving, by a first user device in a wireless network, an indication of availability of a pre-trained model that estimates a channel between a second user device and a network node; receiving, by the first user device, information relating to the pre-trained model; determining, by the first user device, channel estimation information based at least on the information relating to the pre-trained model; and performing at least one of the following: transmitting, by the first user device, a report to the network node including the channel estimation information; or receiving data, by the first user device from the network node, based on the channel estimation information.

24 Claims, 14 Drawing Sheets

(56) References Cited

OTHER PUBLICATIONS

International Search Report and Written Opinion for International Application No. PCT/EP2022/062237, dated Aug. 9, 2022, 12 pages.
Alves et al., "Deep Transfer Learning for Site-Specific Channel Estimation in Low-Resolution mmWave MIMO"; IEEE Wireless Communications Letters; vol. 10, No. 7; Mar. 29, 2021; pp. 1424-1428.
Park et al., "Learning to Demodulate from Few Pilots via Offline and Online Meta-Learning"; Arvix.org; Cornell University Library; Ithaca, New York, USA; Dec. 4, 2020; 15 pages.

* cited by examiner

MODEL TRANSFER WITHIN WIRELESS NETWORKS FOR CHANNEL ESTIMATION

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include: receiving, by a first user device in a wireless network, an indication of availability of a pre-trained model that estimates a channel between a second user device and a network node; receiving, by the first user device, information relating to the pre-trained model; determining, by the first user device, channel estimation information based at least on the information relating to the pre-trained model; and performing at least one of the following: transmitting, by the first user device, a report to the network node including the channel estimation information; or receiving data, by the first user device from the network node, based on the channel estimation information.

According to an example embodiment, a method may include: determining, by a network node, that a pre-trained model, which estimates a channel between a first user device and the network node, is available at the network node or at a first user device; transmitting, by the network node, to one or more user devices, an indication of availability of the pre-trained model that estimates the channel between the first user device and the network node; receiving, by the network node from a second user device, a request for the pre-trained model; and transmitting, by the network node to the second user device, information relating to the pre-trained model.

According to an example embodiment, a method may include: transmitting, by a first user device to either a network node or a second user device, an indication of availability of a pre-trained model that estimates a channel between the first user device and the network node; receiving, by the first user device from either the network node or the second user device, a request for the pre-trained model; and transmitting, by the first user device to the network node via uplink communication or to the second user device via sidelink communications, in response to the request, information relating to the pre-trained model.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
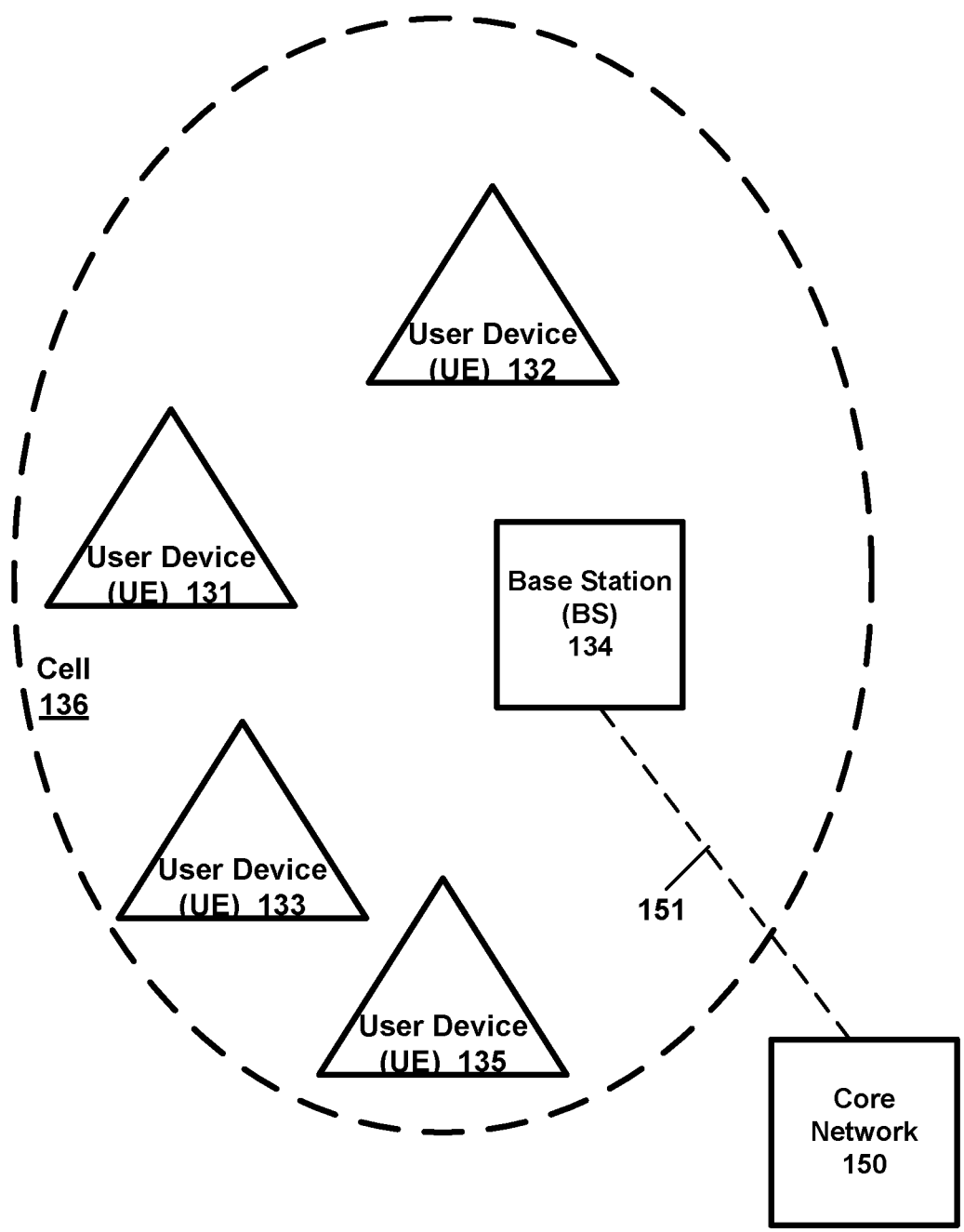
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The techniques described herein may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Also, for example, a UE (or user device or receiver device) may be configured to send measurement reports (e.g., channel state information measurement reports) to a BS (or other network node). For example, a BS may configure a UE to measure one or more quantities (e.g., reference signal receive power (RSRP), determine channel state information (CSI), or determine or measure other information or quantity) for one or more resources or beams. Thus, the measurement report configuration may indicate the quantity or quantities to be measured and for one or more specific resources or beams. For example, a UE may be configured to measure and report one or more quantities, e.g., CSI and/or RSRP for channel state information-reference signal (CSI-RS) beams and/or synchronization signal blocks (SSBs) beams. As an illustrative example, a UE may measure one or more signal parameters (e.g., link quality) of reference signals received from a BS, and may send a channel state information (CSI) report to the BS. An example CSI report, may include, for example, one or more of: a RSRP (reference signal receive power); a Rank Indicator (RI), which is a suitable number of transmission layers for a downlink (DL) transmission; a Precoder Matrix Indicator (PMI), which may indicate what a device (e.g., UE) estimates as a suitable precoder matrix based on the selected rank; and a Channel Quality Indication (or channel quality indicator) (CQI), which may express or indicate the BS-UE channel or link quality, as measured by the UE. The CQI may indicate what the UE estimates as a suitable channel coding rate and modulation scheme (also referred to as modulation and coding scheme (MCS)) based on the selected precoder matrix. In general, precoding may include a UE (or other node) applying a set of precoding weights (each weight including amplitude and/or phase) to a signal or to an antenna (e.g., in order to change the amplitude and/or phase of a transmitted signal), for example, based on the qualities of a channel between the UE and the BS or network node. For example, the gNB or BS may then adjust its UL transmission parameters (e.g., precoder, MCS, and/or a number of transmission layers, etc.) for transmitting to the UE, based on the received CSI report.

According to an example embodiment, one or more nodes (e.g., BS, gNB, eNB, RAN node, UE, user device, relay node, or other node) within a wireless network may use or employ a model, e.g., such as, for example a neural network model (e.g., which may be referred to as a neural network, an artificial intelligence (AI) neural network, an AI neural network model, an AI model, a machine learning model or algorithm, or other term) to perform, or assist in performing, one or more functions. Other types of models may also be used. According to an example embodiment, neural networks may be or may include computational models used in machine learning made up of nodes organized in layers. The nodes are also referred to as artificial neurons, or simply neurons, and perform a function on provided input to produce some output value. A neural network requires a training period to learn the parameters, i.e., weights, used to map the input to a desired output. The mapping occurs via the function. Thus, the weights are weights for the mapping function of the neural network. Each neural network model may be trained for a specific task.

To provide the output given the input, the neural network model must be trained, which may involve learning the proper value for a large number of parameters (e.g., weights) for the mapping function. The parameters are also commonly referred to as weights as they are used to weight terms in the mapping function. This training may be an iterative process, with the values of the weights being tweaked over many (e.g., thousands) of rounds of training until arriving at the optimal, or most accurate, values (or weights). In the context of neural networks (neural network models), the parameters may be initialized, often with random values, and a training optimizer iteratively updates the parameters (weights) of the neural network to minimize error in the mapping function. In other words, during each round, or step, of iterative training the network updates the values of the parameters so that the values of the parameters eventually converge on the optimal values.

According to an example embodiment, neural network models can be trained in either a supervised or unsupervised manner. In supervised learning, training examples are provided to the neural network model or other machine learning algorithm. A training example includes the inputs and a desired or previously observed output. Training examples are also referred to as labeled data because the input is labeled with the desired or observed output. In the case of a neural network, the network learns the values for the weights used in the mapping function that most often result in the desired output when given the training inputs. In unsupervised training, the neural network model learns to identify a structure or pattern in the provided input. In other words, the model identifies implicit relationships in the data. Unsupervised learning is used in many machine learning problems and typically requires a large set of unlabeled data.

According to an example embodiment, the learning or training of a neural network model may be classified into (or may include) two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, a goal of supervised learning may be to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include to find specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also has to optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there is no specific way to compare model performance in most unsupervised learning methods.

In order to provide a CSI report to the gNB, the UE may obtain or calculate a channel estimate based on received reference signals, for example. Channel estimation techniques may recover channel parameters by solving estimation error minimization problems. Machine learning (ML) techniques have been applied to solve estimation problems in various areas from image processing to economics. According to an example embodiment, ML-based estimation techniques (or neural network models) may be applied to the channel estimation problems by using the channel observation samples as input data. Channel estimation with ML techniques (neural network models) may be useful for a variety of applications or circumstances, e.g., such as to offload the channel estimation to a neural network model. Or, at least in some cases, a channel estimation based on a neural network model may be more accurate in a situation where there are relatively few (or relatively infrequent) received reference signals or pilot signal by the UE. In such a case, for example, conventional channel estimation with a sophisticated channel model including many channel parameters may be less accurate than using a trained neural network model, e.g., due to insufficient number of reference signal samples. Other situations may exist in which more accurate channel estimation may be obtained by the UE via use of a trained neural network model. Also, in some cases, less processing overhead and/or less power consumption may be required by a UE to perform channel estimation using a neural network model (ML-based channel estimation), as compared to conventional channel estimation.

Thus, according to an example embodiment, to overcome some limitations of the conventional channel estimation, ML estimation techniques (neural network models) may use a neural network (NN) model as an approximator of (or to estimate) a channel or channel environment (e.g., to estimate a change in amplitude and/or phase for the UE-gNB channel, to obtain a CSI (channel state information) report, or other channel estimate). Also, the designed NN model should be efficiently trained by using the dataset of channel observation samples (e.g., based on the set of reference signals).

However, the learning process to train and optimize a NN (neural network) model may require a relatively long time period. The computation time period of NN model training increases with the dimension of a NN model (e.g., number of layers), e.g., a deep NN model may be employed that includes a large or significant number of layers. Also, if a NN model is designed with a high complexity (and thus, typically providing higher accuracy/performance), the training time period is extended. Moreover, training a NN model may require a high computing power, and it may be advantageous for the system to use a dedicated NN processor or high-performance GPU (graphics processor unit) for NN model training. If the device does not have enough computing capability, training a NN on a local device may not be feasible. Furthermore, a NN model training process may cause or require a large energy consumption. If the computing node, such as a UE, is relying on a limited power source (e.g., battery-powered UE), it may be challenging to effectively and/or efficiently train the NN model on the device. Thus, implementing a NN model on a UE or other limited power source device may be challenging.

Therefore, according to an example embodiment, a UE may take advantage of transfer learning, wherein the UE may obtain information relating to a pre-trained neural network model, e.g., which may have been trained by another UE or by a gNB, and then may be used or re-used) by the UE (e.g., as a starting point) to perform channel estimation, rather than training a full NN model from scratch (or starting from a random set of weights). Transfer learning has been proposed to reuse a pretrained NN model for another ML task. The conventional ML (or neural network model) starts a learning process (performs NN model training) from scratch (e.g., which may be a set of random weights, or an initial set of weights), thus, requiring large resources of computing, time, and energy to perform NN model training. In transfer learning, reusing a pre-trained NN model can significantly reduce the training time and computing resource usage.

Therefore, according to an example embodiment, to improve UE efficiency, ML techniques (NN models) may use transfer learning to take advantage of other NN models that have been previously trained (pre-trained) by another node (e.g., by another UE, gNB, or other node). For UEs that are within a cell (e.g., communicating with the same gNB), and/or within proximity or a limited distance apart, such UEs may have UE-gNB channels that are very similar, or at least somewhat similar. Thus, for example, transfer learning may allow a trained NN model that estimates a UE1-gNB channel of a first UE (UE1) to be used (e.g., at least as a starting point) by a second UE (UE2) as a NN model to estimate a UE2-gNB channel of the second UE (UE2). However, to enable the ML-based channel estimation using transfer learning, the information relating to the pretrained NN models must be communicated among UEs and/or with the gNB. There are currently no techniques for communicating or indicating information relating to pre-trained NN models within a wireless network.

Therefore, according to an example embodiment, transfer learning is used to allow transfer (e.g., either directly via sidelink communications and/or indirectly from or via a gNB) of information relating to a pre-trained NN model from a first UE to one or more other UEs.

Figure 2:
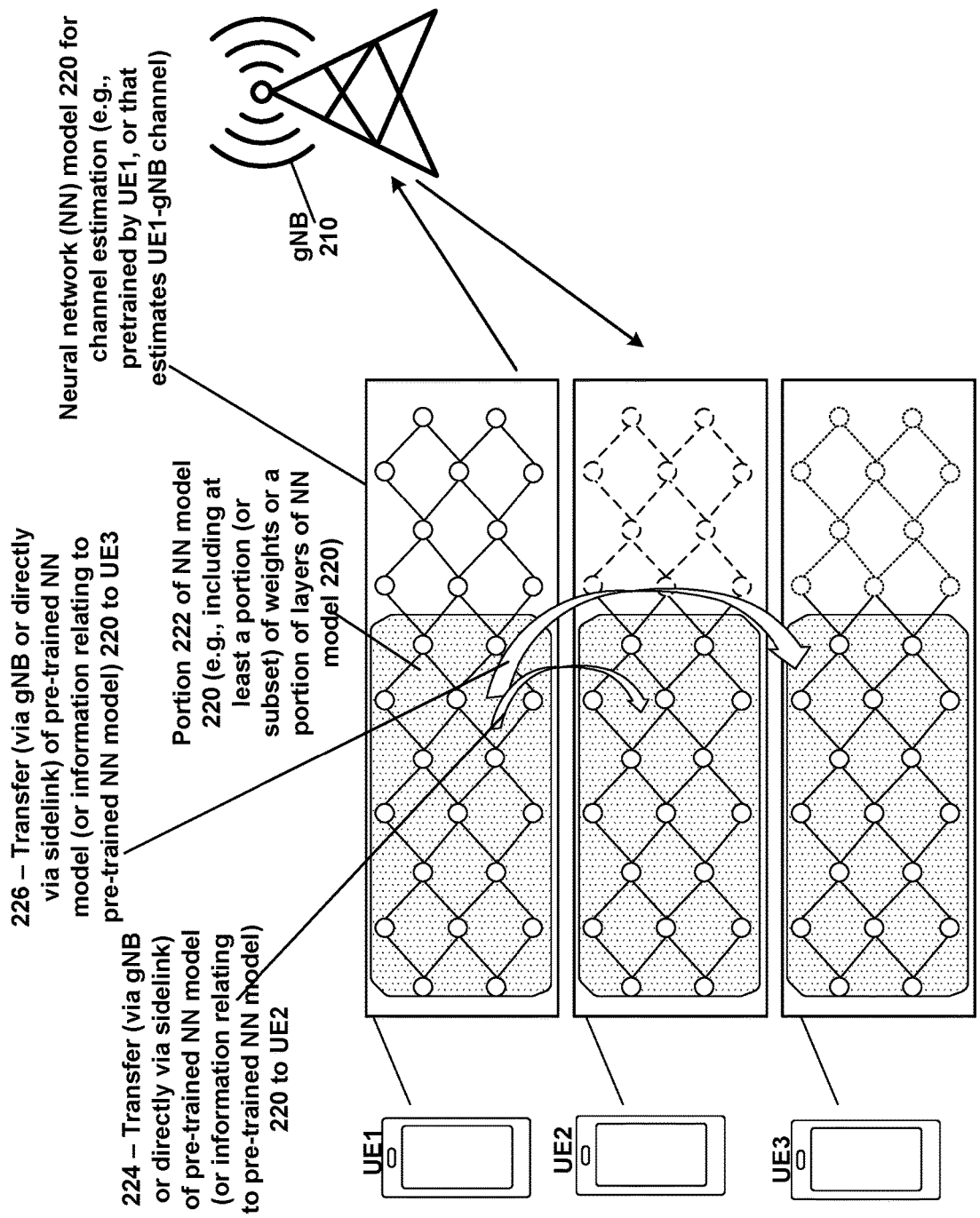
FIG. 2 is a diagram illustrating a transfer of a pre-trained neural network (NN) model to one or more UEs according to an example embodiment.

FIG. 2 is a diagram illustrating a transfer of a pre-trained neural network (NN) model to one or more UEs according to an example embodiment. Several UEs, including UE1, UE2 and/or UE3, may be in communication with a network node (e.g., gNB 210). UE1 may have trained, and/or at least has and/or uses, a trained NN model 220 for channel estimation. NN model 220 may include a plurality of nodes organized in layers. The nodes are also referred to as artificial neurons, or simply neurons, and perform a function on provided input to produce some output value. A neural network requires a training period to learn or adjust the parameters, i.e., weights, used to map the input to a desired output. The mapping occurs via one or more activation functions. Some example activation functions may include Sigmoid, reLU and Tanh, as examples. Each neural network model may be trained for a specific task. In this example, the NN model 220 is trained to estimate a channel between UE1 and gNB 210. Thus, for example, NN model may output channel estimation information based on reference signal inputs. Thus, the NN model 220 may output channel estimation information (e.g., amplitude, phase, CSI, or other channel estimation information) based on reference signals received by UE1 from gNB 210.

In some cases, a pre-trained NN model 220 used for channel estimation for UE1-gNB channel may also be useful in at least approximating (or being used as a starting point to estimate) a channel of one or more other UEs. Therefore, various techniques are described herein that allow for transfer of information relating to a pre-trained NN model 220 to one or more other UEs, such as to UE2 and/or UE3. Therefore, at 224, information relating to the NN model 220 may be transferred to UE2 (either via gNB 210, or directly from UE1 via sidelink communications). At 226, at least a portion 222 of NN model 220 may be transferred to UE3 (either via gNB 210, or directly from UE1 via sidelink communications).

An indication of availability of a pre-trained NN model that estimates a channel may be provided to one or more UEs and/or to gNB 210. For example, UE2 and/or UE3 may receive a dedicated message or system information (e.g., system information block (SIB)) from either gNB 210, or directly from UE1 via sidelink communications, that includes an indication of availability of a NN model (220) that estimates a channel between UE1 and gNB 210.

Also, gNB 210 may determine that a pre-trained NN model 220 that estimates a UE-gNB channel for UE1 is available at the gNB 210 or is available at UE 1. This may include the gNB 210 either (for example): generating a pre-trained NN model (e.g., based on reference signals, such as sounding reference signals, received by the gNB 210), which estimates a channel between UE1 and gNB 210; receiving, by gNB 210 from UE1, a pre-trained NN model, which estimates the channel between UE1 and gNB 210; or receiving, by gNB 210 from UE1, an indication that UE1 has available a pre-trained NN model (220), which estimates the channel between UE1 and gNB 210. gNB 210 may then notify UE2, UE3 (and/or other UEs), e.g., via transmission or broadcasting of system information block (SIB), or via transmission of a dedicated message, of an availability of the pre-trained NN model 220.

For example, after receiving an indication of the availability of a pre-trained NN model, UE2 and/or UE3 may send a request for, and then may receive, at least a portion of the pre-trained NN model 220. For example, UE2 may send a request for the pre-trained NN model to either gNB 210, or directly to UE1 via sidelink communications. For example, the request may include a full/partial indication that indicates a request for either a full pre-trained neural network model, or a partial amount or portion of the pre-trained neural network model. Or, the request may indicate a portion, percentage, or a number of layers that is requested of a pre-trained NN model, (e.g., a request for only 50% of the layers of the pre-trained NN model).

The requesting UE (e.g., UE2 or UE3 in this example) may then receive information relating to the pre-trained NN model, e.g., which may include, for example, at least a portion of the pre-trained NN model 210, either from gNB 210, or directly from UE1 via sidelink communications, and/or NN model configuration information, and/or other information. For example, UE2 may receive a NN model transfer message that includes information relating to the pre-trained NN model, e.g., which may include parameters (e.g., weights) for a plurality of (shared) layers of the pre-trained NN model, or a plurality of weights or compressed weights of the pre-trained NN model 210 (or of at least the portion of the requested NN model 210). The NN model transfer message, e.g., including information relating to the pre-trained NN model, may also include NN model configuration information, e.g., which may indicate one or more types of activation functions that are used by the pre-trained NN model, a number of layers that is provided, a location of UE1, and/or a time stamp (e.g., indicating a time of storage and/or creation) for the NN model, and/or other NN model configuration information. The time or timestamp for the NN model may indicate a time the NN model was created or stored. The NN model may be accurate (e.g., accurately models the UE-gNB channel) for a period of time, but channel conditions for the UE-BS may frequently change, such as based on changes in the environment, movement of the UE, etc. Thus, the time or timestamp of the NN model may be used by a to confirm that it is a latest NN model, and not stale or expired. Also, the location information may indicate a location of the measuring/source UE (for which the NN model models the UE-gNB channel). Any localization or positioning technique can be used to determine and/or indicate a location of a source UE (e.g., UE1), and location may be provided in any format, such as in X,Y coordinates, GPS coordinates, etc.

For example, UE2 may compare its location to the location of UE1 to determine that UE1 and UE2 are within some maximum distance, e.g., to increase the likelihood of the UE1-gNB channel being similar to the UE2-gNB channel. UE2 may also compare the current time to the time stamp for the pre-trained NN model to determine whether the pre-trained NN model is still current, and is not stale (e.g., since channels may change relatively quickly). The shared layers of the pre-trained NN model 210 refer to layers of the NN model that are transferred to UE2 and/or UE3 (and thus, shared layers are shared with other UEs), whereas unshared layers refer to those layer or portion of the pre-trained NN model that are not provided or shared with UE2 or UE3, for example.

A source UE (or source node) may refer to a UE that created or determined or trained the NN model for a channel (e.g., for its UE-gNB channel) and/or the UE that provides or forwards (or information relating to, such as a portion of) its pre-trained NN model to another node. A destination UE (or destination node) is a UE that obtains (or receives) the forwarded information relating to the pre-trained NN model, such as the pre-trained NN model (e.g., weights and/or NN model configuration information) (e.g., either via a gNB, or directly from the source UE via sidelink communications). Thus, in this example, UE1 is a source UE (since it creates, trains, and/or provides the NN model for channel estimation), while UE2 and UE3 are destination UEs (since they receive the pre-trained NN model). Sidelink communications may refer to, or may include, communications that occur directly between two UEs (or other nodes), without the use of a gNB to forward information between the UEs. Thus, sidelink communications may refer to or may include direct UE-to-UE communication.

UE2 and/or UE3 may then use the received (at least a portion of the) pre-trained NN model 210 to obtain a channel estimate for the UE2-gNB channel or UE3-gNB channel, respectively. UE2 and/or UE3 may also further train its NN model (e.g., to train its NN model, including the unshared layers of its NN model, using the shared layers as a starting point for training). UE2 and/or UE3 may also transmit a report to gNB 210 indicating the channel estimation information, e.g., that was obtained as an output from its NN model (or based on the output of the NN model), which generates outputs based on inputs that may include reference signals received from the gNB. Also, UE2 and/or UE3 may receive data from the gNB 210 based on the channel estimation information (e.g., gNB 210 may select and use one or more transmission parameters for downlink transmission, e.g., such as modulation and coding scheme (MCS), rank, perform precoding, etc., based on the channel estimation information received from UE2 or UE3, respectively).

Figure 3:
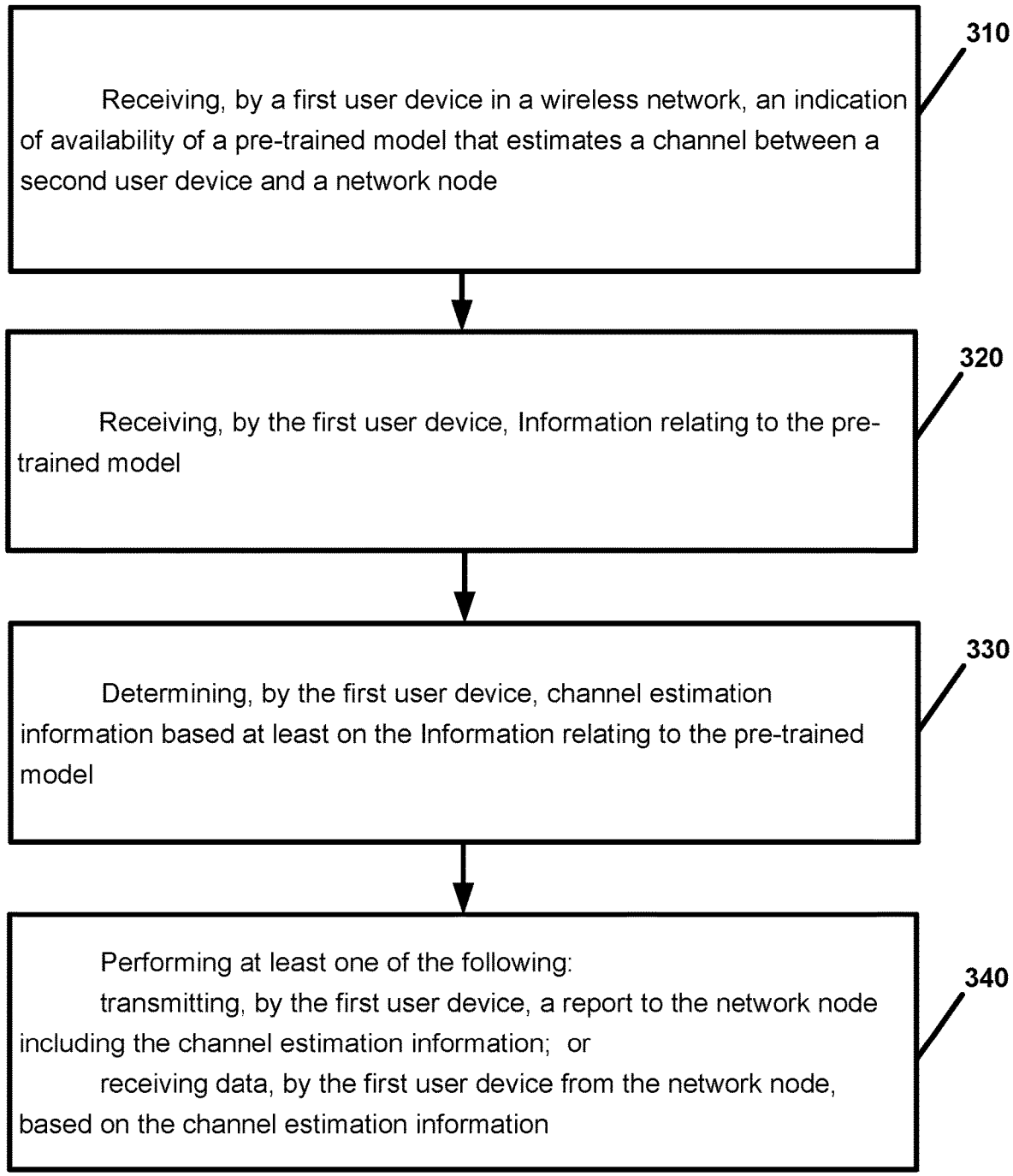
FIG. 3 is a flow chart illustrating operation of a user device (UE) according to an example embodiment.

FIG. 3 is a flow chart illustrating operation of a user device (UE) according to an example embodiment. Operation 310 includes receiving, by a first user device in a wireless network, an indication of availability of a pre-trained model that estimates a channel between a second user device and a network node. Operation 320 includes receiving, by the first user device, information relating to the pre-trained model. Operation 330 includes determining, by the first user device, channel estimation information based at least on the portion of the pre-trained model. And, operation 340 includes performing at least one of the following: transmitting, by the first user device, a report to the network node including the channel estimation information; or receiving data, by the first user device from the network node, based on the channel estimation information.

The method of FIG. 3 may include one or more additional features or functions as follows:

In an example embodiment, the channel estimation information may include at least one of: information estimating an amplitude and/or phase, or a change in amplitude and/or phase, associated with a channel; or a channel state information (CSI), including one or more of a channel quality indicator (CQI), a precoding matrix indicator (PMI), and/or a rank indicator (RI).

In an example embodiment, the receiving an indication of availability may include at least one of: receiving, by the first user device from the network node via a system information block (SIB) transmission, an indication of availability of a pre-trained neural network model; or receiving, by the first user device from the network node, a dedicated message with an indication of availability of the pre-trained neural network model.

In an example embodiment, the receiving an indication of availability of a pre-trained neural network model may include: receiving, by the first user device, an indication of availability of a pre-trained neural network model that estimates a channel between the second user device and the network node, wherein the indication indicates at least one of a time of creating or a time of storage of the pre-trained neural network model and/or a location of the second user device.

In an example embodiment, the receiving information relating to the pre-trained model may include at least one of: receiving at least a portion of a pre-trained neural network model from the network node; receiving at least a portion of the pre-trained neural network model via sidelink communications or higher layer from the second user device; or receiving at least a portion of the pre-trained neural network model via inter-radio access technology (inter-RAT) communications. Or, the receiving information relating to the pre-trained model may include receiving at least one of: a plurality of weights or compressed weights for at least a portion of the pre-trained neural network model; and/or neural network model configuration information, e.g., including information indicating one or more types of activation functions of the pre-trained neural network model.

In an example embodiment, the receiving information relating to the pre-trained neural network model may include: transmitting, by the first user device, to either the second user device or the network node, a request for the pre-trained neural network model; and receiving, by the first user device, information relating to the pre-trained neural network model based on transmitting the request.

In an example embodiment, the transmitting a request may include transmitting, by the first user device, to either the second user device or the network node, a request for the pre-trained neural network model, wherein the request includes a full/partial indication that indicates a request for either a full pre-trained neural network model, or a partial amount or portion of the pre-trained neural network model. The request may indicate a requested portion or a number or amount of layers of the pre-trained neural network that is being requested.

The receiving the information relating to the pre-trained model, may include, e.g., receiving, by the first user device, at least a portion of the pre-trained neural network model (e.g., weights of one or more layers of the pre-trained NN model) during a procedure of the first user device to establish a connection to the network node.

Also, in an example embodiment, the receiving information relating to the pre-trained neural network model may include: determining, by the first user device, at least one of a location of the first user device, or a current time; comparing, by the first user device, the location of the first user device and/or the current time to the time and/or location associated with the pre-trained neural network model; making a determination, based on the comparing, to obtain at least a portion of the pre-trained neural network model; transmitting a request to receive the pre-trained neural network model; and receiving, by the first user device, information relating to the pre-trained neural network model or at least a portion of the pre-trained neural network model from either the network node or the second user device.

Figure 4:
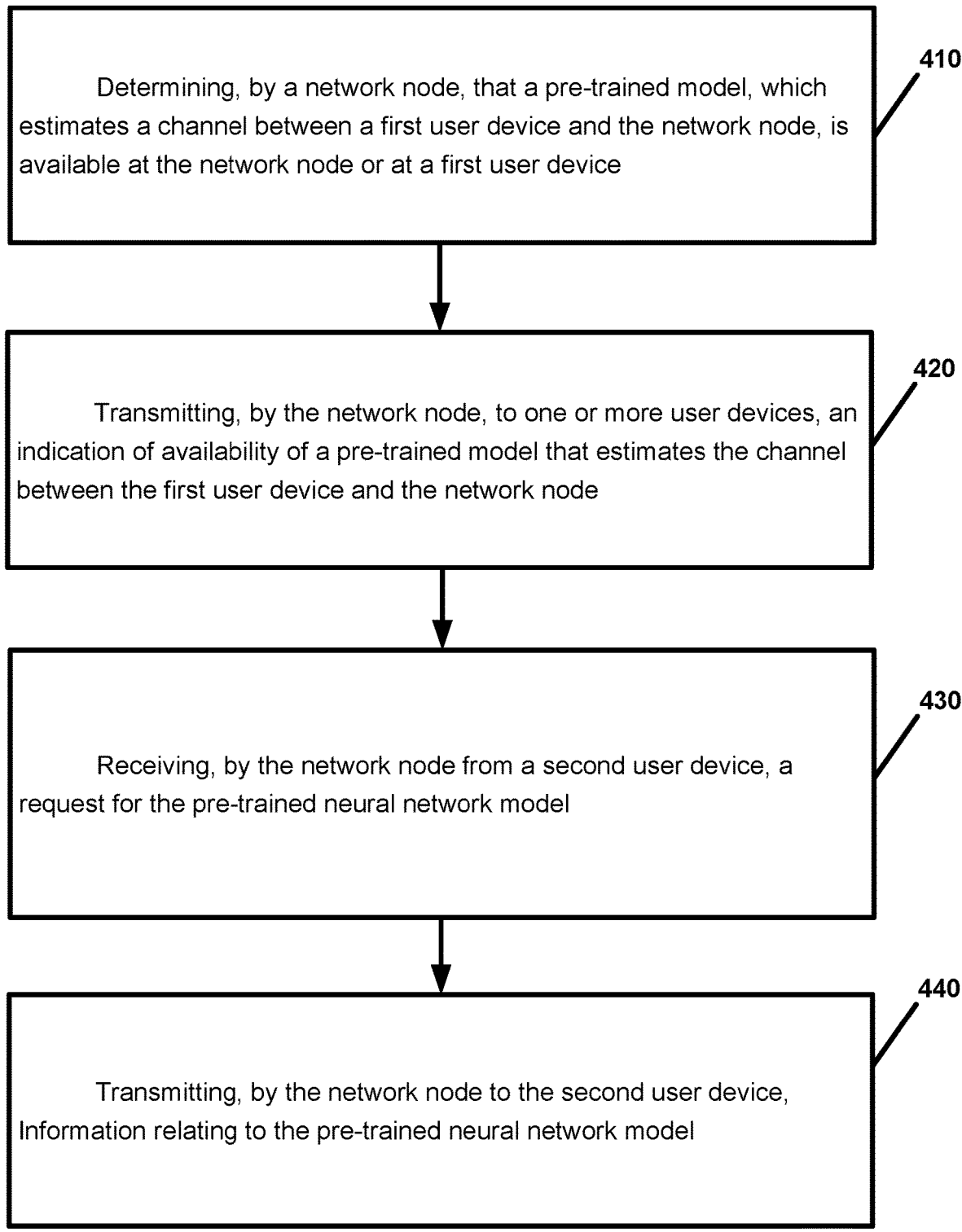
FIG. 4 is a flow chart illustrating operation of a network node according to an example embodiment.

FIG. 4 is a flow chart illustrating operation of a network node according to an example embodiment. Operation 410 includes determining, by a network node, that a pre-trained model, which estimates a channel between a first user device and the network node, is available at the network node or at a first user device. Operation 420 includes transmitting, by the network node, to one or more user devices, an indication of availability of a pre-trained model that estimates the channel between the first user device and the network node. Operation 430 includes receiving, by the network node from a second user device, a request for the pre-trained model. And, operation 440 includes transmitting, by the network node to the second user device, information relating to the pre-trained neural network model. The method of FIG. 4 may include one or more additional features or functions as follows:

The determining that a pre-trained model is available may include at least one of: generating, by the network node, a pre-trained neural network model, which estimates a channel between the first user device and the network node; receiving, by the network node from the first user device, information relating to a pre-trained neural network model (e.g., such as receiving at least a portion of the pre-trained NN model and/or NN model configuration information), which estimates a channel between the first user device and the network node; or receiving, by the network node from the first user device, an indication that the first user device has available a pre-trained neural network model, which estimates a channel between the first user device and the network node.

The transmitting an indication of availability may include at least one of: transmitting, by the network node to one or more user devices, including at least the second user device, via a system information block (SIB) transmission, an indication of availability of a pre-trained neural network model; or transmitting, by the network node to one or more user devices including at least the second user device, a dedicated message with an indication of availability of the pre-trained neural network model.

The transmitting, by the network node to the second user device, at least a portion of the pre-trained neural network model, may include transmitting a plurality of weights for at least a portion of the pre-trained neural network model, and/or neural network configuration information including information indicating one or more types of activation functions of the pre-trained neural network model.

The request for the pre-trained model may include a full/partial indication that indicates a request for either a full pre-trained neural network model, or a partial amount or portion of the pre-trained neural network model; wherein the transmitting at least a portion of the pre-trained neural network model may include at least one of: transmitting, by the network node to the second user device, only a portion of the pre-trained neural network model (e.g., including weights of only a subset of layers of the pre-trained NN model) if the full/partial indication indicates a request for a partial amount or portion of the pre-trained neural network model; or transmitting, by the network node to the second user device, the full pre-trained neural network model (e.g., including weights of all layers of the pre-trained NN model) if the full/partial indication indicates a request for a full pre-trained neural network model.

Figure 5:
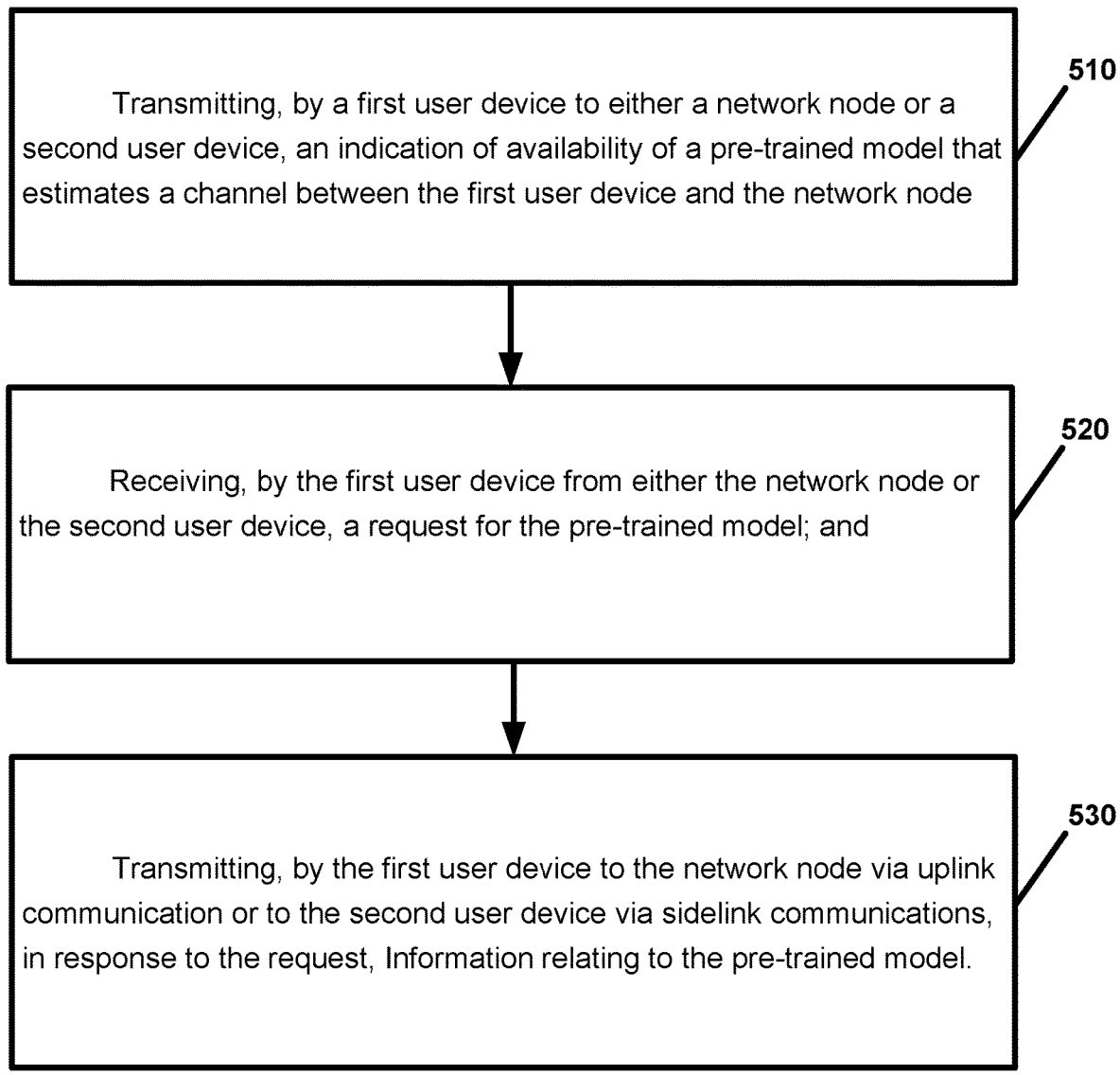
FIG. 5 is a flow chart illustrating operation of a user device (UE) according to another example embodiment.

FIG. 5 is a flow chart illustrating operation of a user device (UE) according to another example embodiment. Operation 510 includes transmitting, by a first user device to either a network node or a second user device, an indication of availability of a pre-trained model that estimates a channel between the first user device and the network node. Operation 520 includes receiving, by the first user device from either the network node or the second user device, a request for the pre-trained model. And, operation 530 includes transmitting, by the first user device to the network node (e.g., to be forwarded to the second user device from the network node) via uplink communication or to the second user device via sidelink communications, in response to the request, information relating to the pre-trained model. As noted, the pre-trained model may be, for example, a pre-trained NN model.

Further illustrative examples are provided below.

As noted, a model request (e.g., a NN model request) that requests a pre-trained model, may be sent by a destination UE (or destination node) to a gNB or a source UE (or a cluster head (CH) that is a source of a NN model). In some cases, the NN model request may indicate one or more parameters (or criteria) of a requested or preferred NN model, e.g., a full/partial indication to indicate whether a full or partial NN model is being requested, an amount or portion or % of the NN model that is being requested, or a number of layers of the NN model that is being requested, a location or range of locations of interest (e.g., within some maximum range around the destination UE), a time window or range of time stamps for the NN model that are acceptable, a type of activation function(s) for the NN model that are requested or preferred, a purpose or application of the NN model (e.g., indicating channel estimation in this case, in the event that NN models may be requested or obtained for other purposes, applications or radio functions), and/or other NN model criteria. Thus, in some cases, the source UE or gNB may perform some filtering or selection among one or more available NN models, e.g., to select the NN model that fits or best fits the requested criteria. The source UE and/or gNB (which forwards the requested NN model) may select a NN model that meets such requested criteria, or may determine whether such a NN model is available (e.g., which meets the criteria of the requested NN model). In the event that the requested NN model is available, the source UE and/or gNB may then send or forward the NN model (e.g., either full or partial NN model) to the destination (or may forward information relating to the pre-trained NN model, which may include NN model weights and/or NN model configuration information, or other NN model information). In some cases, even though requested criteria are received in the NN model request, the source UE and/or gNB may simply forward a NN model that may or may not meet such criteria, or may forward any NN model that it has. Thus, in some cases, the criteria may be strictly followed by the source UE or gNB to select and forward the requested NN model if it fits the criteria, while in other cases the source UE and/or gNB may apply a best efforts to find and send a NN model that best fits or satisfies the requested criteria (and which may or may not satisfy one or more or all of the criteria), while in other cases the source UE and/or gNB may simply ignore any requested NN model criteria and may forward a (or any) available NN model (or information relating to the requested NN model) (which may or may not fit the requested criteria).

Also, the destination UE (which will receive the requested NN model from the gNB or via direction communication from the source UE/CH via sidelink communications) may also check or confirm one or more NN model criteria (such as those listed above) to determine if the received NN model meets its required or preferred criteria (e.g., amount or portion of NN Model, a number of layers, a type of activation function, a time stamp that indicates the NN model is recent and not stale, a location that indicates that the NN model is from a source UE that is nearby or within some maximum distance or range of the destination UE, and/or a purpose or application for which the NN model has been trained (e.g., channel estimation in this example). The destination UE may then determine whether to use the received NN model (e.g., if it meets one or more or all of the criteria), or may send a request for another NN model, e.g., in the case where the received NN model is unacceptable or does not satisfy one or more criteria. If the NN model is acceptable, the destination UE may then use the received NN model to train one or more unshared layers of its NN model (e.g., using the received partial NN model as an initial state of its NN model), determine channel estimation information based on received reference signals and the NN model, receive data from the gNB or UE based on the NN model (e.g., where one or more transmission parameters used by transmitting UE or gNB may be selected based on the NN model, for transmission to the destination UE), and/or the destination UE may send a report to the gNB that provides the channel estimation information, e.g., a CSI report, amplitude and/or phase, or other channel state information or channel estimation information.

Figure 6:
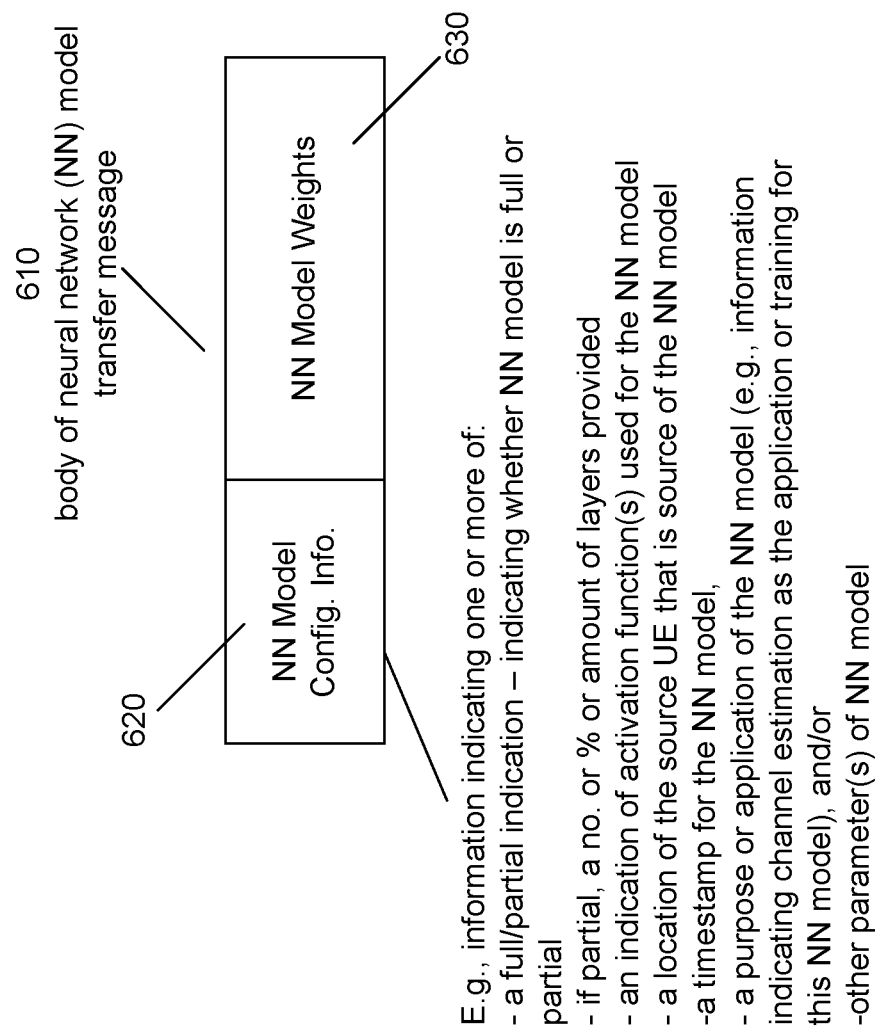
FIG. 6 is a diagram illustrating a body, or at least a part, of a neural network model transfer message that may be used to transfer (or transmit) a neural network model to a destination UE according to an example embodiment.

FIG. 6 is a diagram illustrating a body, or at least a part, of a neural network model transfer message that may be used to transfer (or transmit) information relating to a pre-trained neural network model to a destination UE according to an example embodiment. As noted, a requested NN model (or information relating to a requested pre-trained NN model) may be sent or delivered to a destination UE via a neural network model transfer message 610, or other message. NN model transfer message 610 may include a plurality of weights 630 of the plurality of layers for the NN model (or partial NN model) that is being transferred or forwarded to the destination UE. In addition, NN model transfer message 610 may include a NN model configuration information 620, e.g., which may indicate, for example, one or more of: a full/partial indication indicating whether a full or partial NN model is being provided; a number or amount or percentage of layers that are being provided; a location of the source UE or source CH (e.g., at the time of NN model was last trained or updated, before being forwarded), a timestamp of the NN model (e.g., which may indicate a time associated with the NN model, such as indicating a time of either: creating, updating, most recent training, storing or forwarding of the NN model); a purpose of the NN model (e.g., indicating a purpose or application (for the NN model) of channel estimation in this example, but the destination UE may request and/or receive NN models for other radio purposes or applications, so these different purposes or applications may be indicated for the received NN model); and/or other parameter or NN model configuration information (as these are merely illustrative examples). In some cases, the NN model configuration may be preconfigured (and thus known by destination UE in advance), and for such case, there may be no NN model configuration information 620 included or provided, for example.

Table 1 illustrates that a multi-bit value (which may be included in NN model configuration information 620, FIG. 6) that may be used to encode information indicating the type of activation function(s) that are used for the pre-trained NN model. For example, a value of 00 may indicate that sigmoid activation function is used; a value of 01 may indicate that a ReLU activation function is used; and/or a value of 10 may indicate that a Tanh activation function is used for the NN model. This is merely an example, and other values and/or activation functions may be used.

TABLE 1

Activation functions used in NN model may be indicated using multi-bit value.

| Types (indication of activation functions in NN model) | 0 (00) | 1 (01) | 2 (10) |
|---|---|---|---|
| Activation functions | Sigmoid | ReLU | Tanh |

Figure 7:
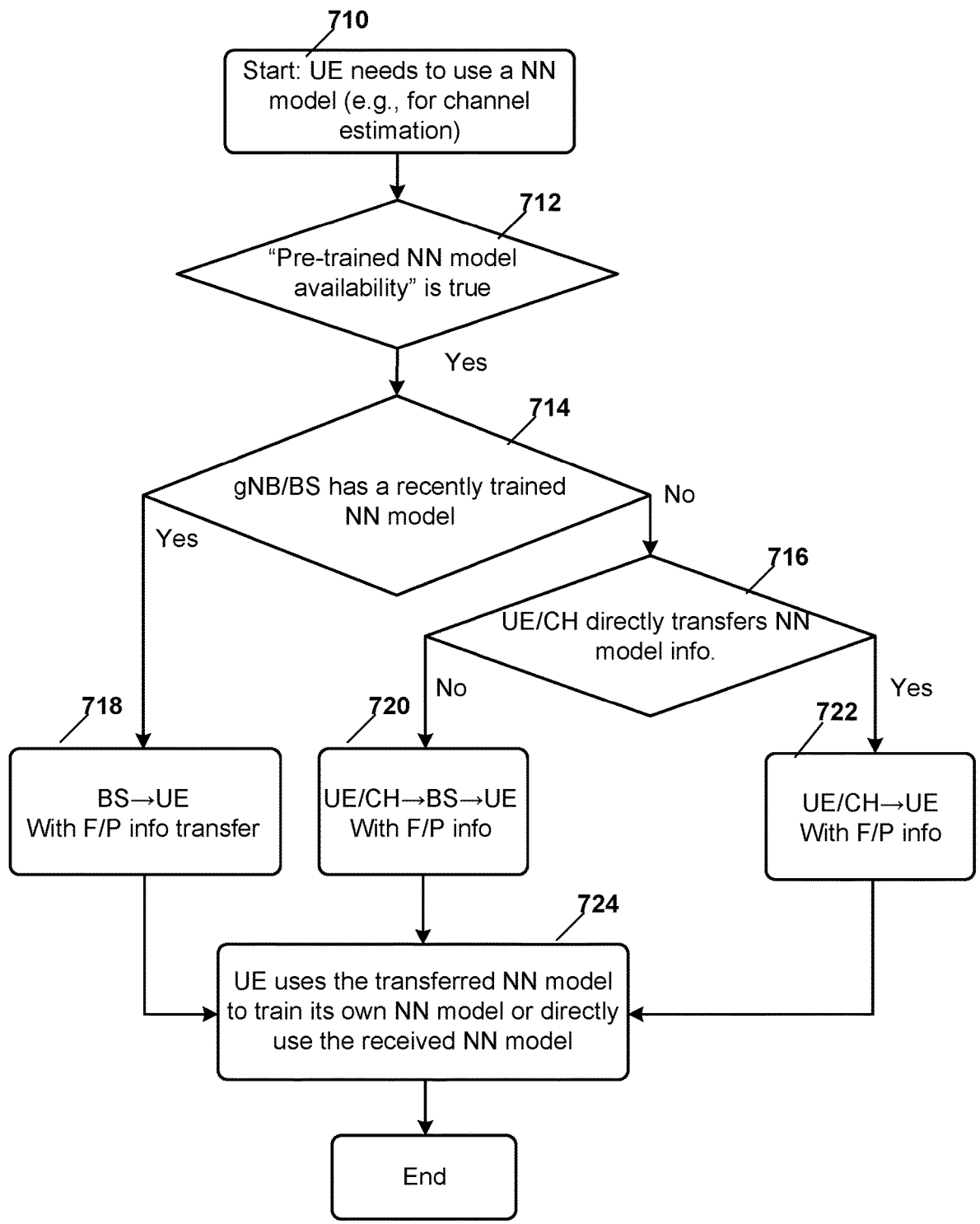
FIG. 7 is a diagram illustrating a process of pre-trained neural network model transfer according to an example embodiment.

FIG. 7 is a diagram illustrating a process of pre-trained neural network model transfer according to an example embodiment. The process of FIG. 7 may be performed by the destination UE. At 710, it is determined that the destination UE needs, or would like to use, a NN model, such as for channel estimation in this case. At 712, it is determined that there is a pre-trained NN model that is available (e.g., NN model availability is true). At 714, it is determined whether gNB/BS has a recently trained NN model. At 718, if the gNB has a recently trained NN model (for channel estimation), then at 718, the gNB/BS may forward information relating to the pre-trained NN model, such as (e.g., weights of) the pre-trained NN model (or partial NN model) to the destination UE, and may provide a full/partial indication for such forwarded NN model, to indicate whether a full or partial NN model is being provided, and/or may provide NN model configuration information. At 716, it is determined whether the source UE/cluster head (CH) will directly transfer the requested NN model to the destination UE. If direct forwarding will be performed, then at 722, the source UE directly forwards the information relating to the pre-trained NN model, such as weights and/or configuration information for the pre-trained NN model, e.g., with full/partial indication, to destination UE via sidelink communications. If direct forwarding will not be performed, then at 720, the source UE/source CH forwards the NN model to the gNB, which then forwards such pre-trained NN model to the destination UE, e.g., with full/partial indication. At 724, the destination UE may then use the received pre-trained NN model, which may include, e.g.: training the NN model, which may include training one or more unshared layers and/or shared layers of its NN model using the received NN model as a starting point or initial state; receiving data from a UE and/or gNB based on the NN model (e.g., where one or more transmit parameters and/or receive parameters may be configured based on the channel estimate output or provided by the pre-trained NN model; and/or determining channel estimation information based on received reference signals and based on at least the pre-trained NN model (e.g., which may be further trained by the destination UE).

Figure 8:
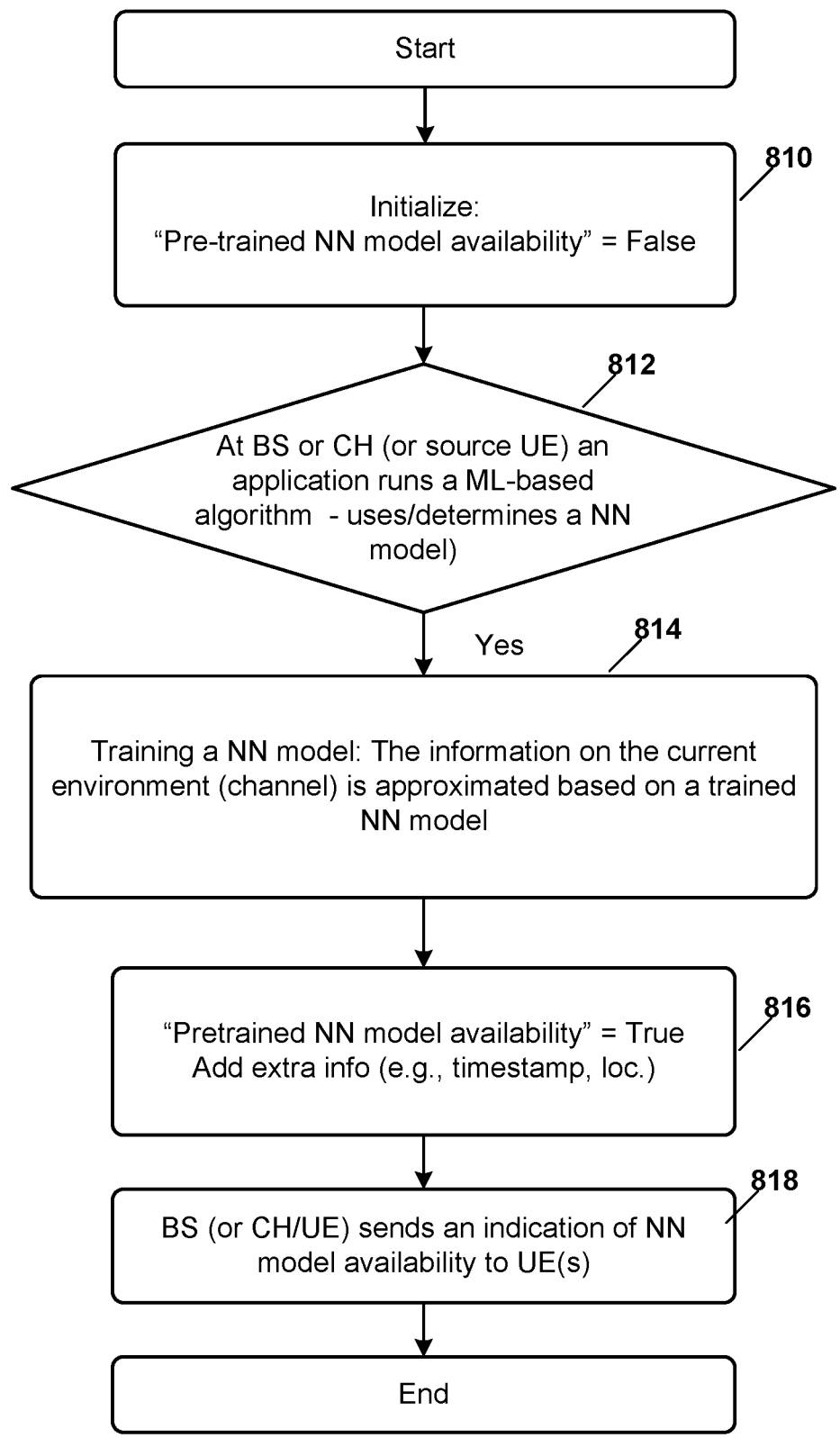
FIG. 8 is a diagram illustrating a process that may be performed to set a flag indicating availability of a neural network model for channel estimation.

FIG. 8 is a diagram illustrating a process that may be performed to set a flag indicating availability of a pre-trained neural network model for channel estimation. This flag may be set by a network node, e.g., gNB or BS. At 810, the gNB may initialize, as a default, the pre-trained NN model availability to false. Thereafter, a NN model for channel estimation may be trained by a source UE or by the gNB. At 812, the gNB may determine that the gNB has received a pre-trained NN model from a UE, or that the gNB has generated or trained a NN model, or that the gNB has received an indication of availability of a NN model from a source UE. In any of such case(s) (meaning that a pre-trained NN model is available), at 816, the gNB may set the pre-trained NN model availability to True, including adding any additional information or parameters associated with the pre-trained NN model. At 818, the gNB may transmit (e.g., via transmission of SIB or dedicated message(s)) an indication of availability of a pre-trained NN model for channel estimation, which may be or may include a message with the pre-trained NN model availability set to True, and may include other information or parameters associated with the available pre-trained NN model, such as location information (location of source UE where NN model was trained), a UE ID that identifies the source UE for the NN model, a timestamp for the NN model (e.g., indicating a time of training, a time of storage, and/or a time of transmission or receipt of such pre-trained NN model), a purpose or application for which the NN model was trained (e.g., indicating channel estimation in this case), etc.

Figure 9:
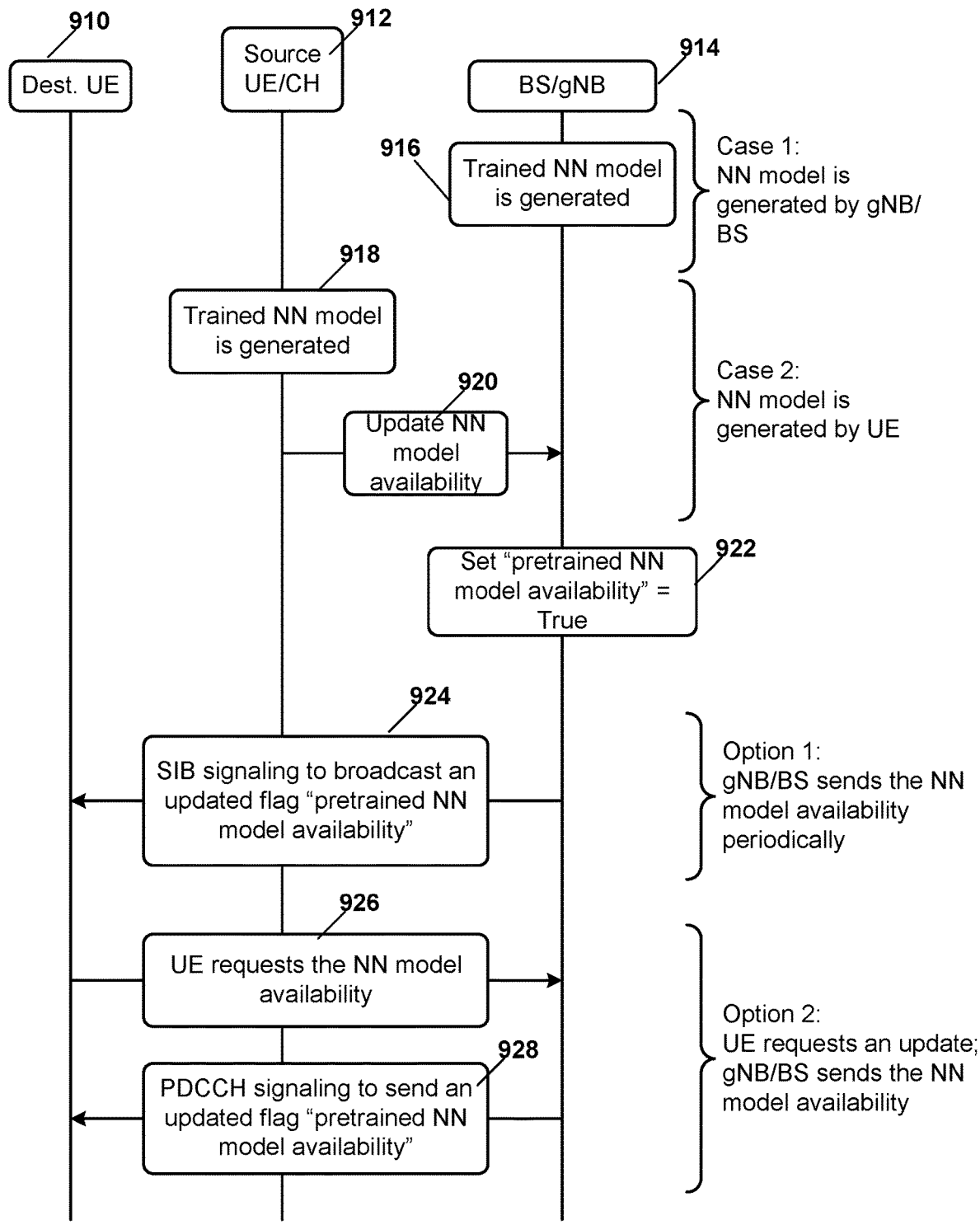
FIG. 9 is a diagram that illustrates a process to update and share the pre-trained neural network (NN) model availability flag with one or more UEs (e.g., possible destination UEs that may be interested in receiving the pre-trained NN model for channel estimation).

FIG. 9 is a diagram that illustrates a process to update and share the pre-trained neural network (NN) model availability flag with one or more UEs (e.g., possible destination UEs that may be interested in receiving the pre-trained NN model for channel estimation). As shown in FIG. 9, a source UE 912 and a destination UE 914 may be in communication with each other via sidelink communications, and may be in communication with gNB 914. Different cases and different options may be possible for generating a pre-trained NN model, and communicating the availability of such pre-trained NN model to UEs.

At case 1, a trained NN model is generated (e.g., trained) by gNB 914, e.g., based on reference signals received from UE 912. Thus, at 916, the gNB 914 generates the trained NN model.

At case 2, the NN model is generated by source (or a neighbor) UE 912. Thus, at 918, the source UE 912 generates a trained NN model. In this example case, the neighboring UEs may locally form a cluster while selecting one of the UE as cluster head (CH). Since CH communicates with all UEs including the destination UE, CH collects and stores the NNs trained by the UEs in the cluster. Therefore, if CH has a new pretrained NN, the event of NN generation is reported from CH to the base station, and the base station sets the flag to True.

And, at 920, the source UE 912 sends a message to gNB 914 indicating that a NN model is available at the source UE 912. At 922, the gNB 914 sets the "pre-trained NN model availability flag" to True. At option 1, the gNB 914 sends the NN model availability flag or indication periodically. For example, at 924, the gNB 914 transmits or broadcasts system information block (SIB) signaling including the "pre-trained NN model availability flag." At option 2, the NN model availability indication or flag may be transmitted by the gNB upon request from a UE. Thus, for example, at 926, the gNB 914 receives a request for NN model availability from a destination UE 910. And, at 928, in response to receiving the request at 926, the gNB 914 transmits to destination UE 910 (e.g., via physical downlink control channel (PDCCH) signaling or other message) the pre-trained NN model availability indication, such as the "pre-trained NN model availability flag" to inform the destination UE that a pre-trained NN model for channel estimation is available.

Therefore, after the flag is set to True, the gNB 914 notifies the availability flag change to the destination UE 912 by using two options. In Option 1 of FIG. 9, SIB signaling is used periodically send the updated flag to the destination UE (and possibly other UEs). Also, it is possible that the destination UE wants to check the latest availability of NN model. In this case, Option 2 in FIG. 9 shows that the destination UE 910 sends a request message to the gNB 914. Then, the gNB 914 uses a dedicated DCI field in PDCCH signaling to send an updated flag to the destination UE 910. Therefore, in this manner, the destination UE 910 may obtain the current flag value (NN model availability indication or flag). Additionally, in both Options 1 and 2, the gNB 914 may send to the destination UE 910 the flag with additional information associated with the NN model that is available, such as a timestamp, location information, etc.

In FIG. 7, after checking the flag to determine whether a NN model is available, the destination UE may request the gNB to send a pre-trained NN model (or request that the gNB send information relating to the pre-trained NN model). Also, the request sent by the destination UE to the gNB may include a full/partial indication that indicates whether a full NN model is requested, or whether a partial NN model is being requested. It is possible that the machine learning (ML) algorithm running on the destination UE may not need a full NN model. Also, in some cases, using a full pre-trained NN model (trained at another UE) may result in over-fitting (e.g., where some of the shared layers of full NN model may not accurately reflect channel of destination UE), and also sending the full NN model may consume additional resources. Thus, it may be advantageous, at least in some cases, for the destination UE to request and/or receive only a partial pre-trained NN model, rather than the full pre-trained NN model. Therefore, the destination UE may decide to download (request and receive) only a partial NN model. To do this, the destination UE may include a full/partial indication within its request for pre-trained NN model that is sent to the gNB or source node.

Figure 10:
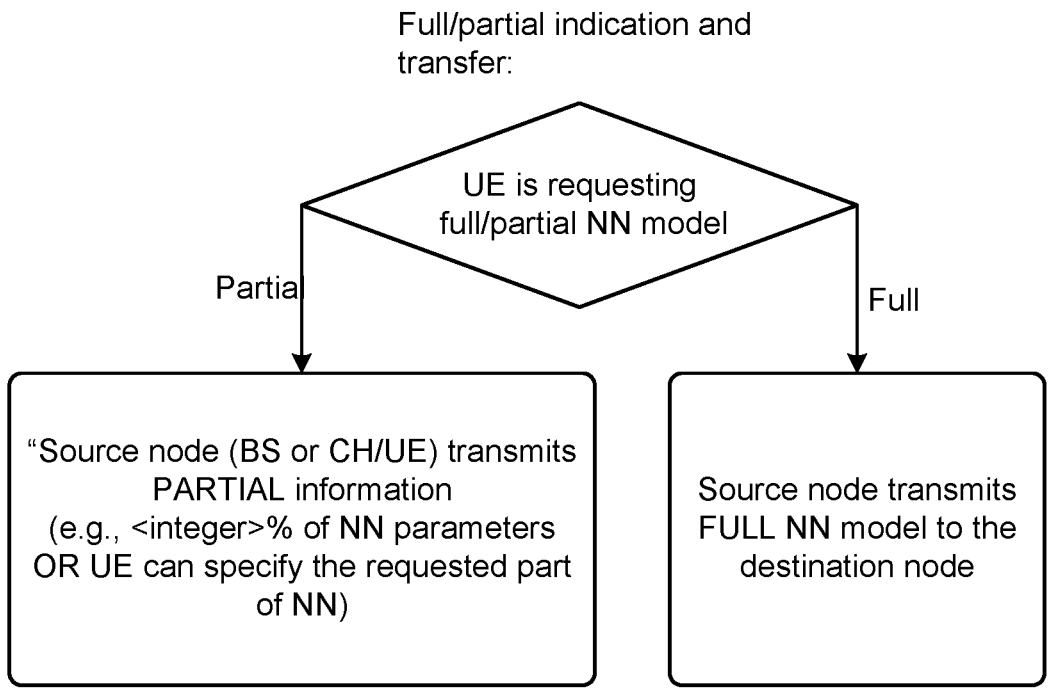
FIG. 10 is a diagram illustrating a full/partial indication transfer or transmission according to an example embodiment.

As shown in FIG. 10, the destination UE may communicate to the gNB an indication of whether a full or partial NN model is requested. FIG. 10 is a diagram illustrating a full/partial indication transfer or transmission according to an example embodiment. The destination UE may request a partial pre-trained NN model, which may cause the source node (gNB or source UE/CH) to transmit the partial NN model. On the other hand, the destination UE may request a full pre-trained NN model, which causes the source node (e.g., gNB or source UE/CH) to transmit the full pre-trained NN model to the destination UE. Moreover, destination UE may request a recent version of the pre-trained NN model. For instance, the request message of the UE can include a threshold value in terms of the age (or a maximum allowed age) of pre-trained NN model (such as a maximum age of the pre-trained NN model). In such case, for example, only pre-trained NN models (or information relating to such pre-trained NN models) that meet such maximum allowed age should be sent to the destination UE, e.g., to ensure that the UE receives a current or most recent pre-trained NN model, since channel conditions may change quickly within the wireless network.

When the gNB receives a request from the destination UE, the gNB may check where the pre-trained NN model is stored on the network. Also, the gNB may calculate the age of the stored or available pre-trained NN model by using the timestamp of the pre-trained NN model. By comparing the calculated age of pre-trained NN model to the maximum allowed age indicated by destination UE, the gNB can decide whether the pre-trained NN model stored at the gNB is current (age of pre-trained NN model is within the maximum age threshold indicated by destination UE) and thus may be transmitted to the destination UE, or is too old or stale, and thus, will (or should) not be transmitted to the UE. For data transmission, pre-trained NN model may have a large size, and thus, may typically be transmitted via user plane or data channel, such as PDSCH (physical downlink shared channel).

Also, it is possible that the gNB does not have a suitable version of a pre-trained NN model. In this case, the destination UE must receive the latest pretrained NN stored at CH. CH is able to maintain the most recently updated version of trained NNs since UEs in the cluster regularly update a new version of trained NNs to CH. In general, when the pre-trained NN model is stored at CH (or at another UE), the NN model may be sent from CH (or source UE) to the destination UE via two paths. First, CH can directly send the information to the requesting UE by using device-to-device (D2D) or sidelink communications. Second, CH can upload (or send) the new or updated pre-trained NN model to the gNB. In this case, the destination UE downloads (or requests and receives) the pre-trained NN model from the gNB. When the gNB is used as a relay, the signaling overhead increases compared to the first option using a D2D or sidelink communications. However, by using the gNB to relay the NN model transmission, the gNB's outdated NN model may be replaced or updated with the new pre-trained NN model. Therefore, in such case of forwarding the NN model via the gNB, this allows the gNB to receive and/or maintain the latest version of the pre-trained NN model(s). Thus, when another UE requests the same information, or requests a pre-trained NN model for channel estimation in the future, the gNB sends its updated or latest version of the pre-trained NN model to the requesting UE without (necessarily) communicating to CH (e.g., gNB has the current or updated version of NN model, and does not need to request or obtain the current version of NN model from CH or source UE).

Figure 11:
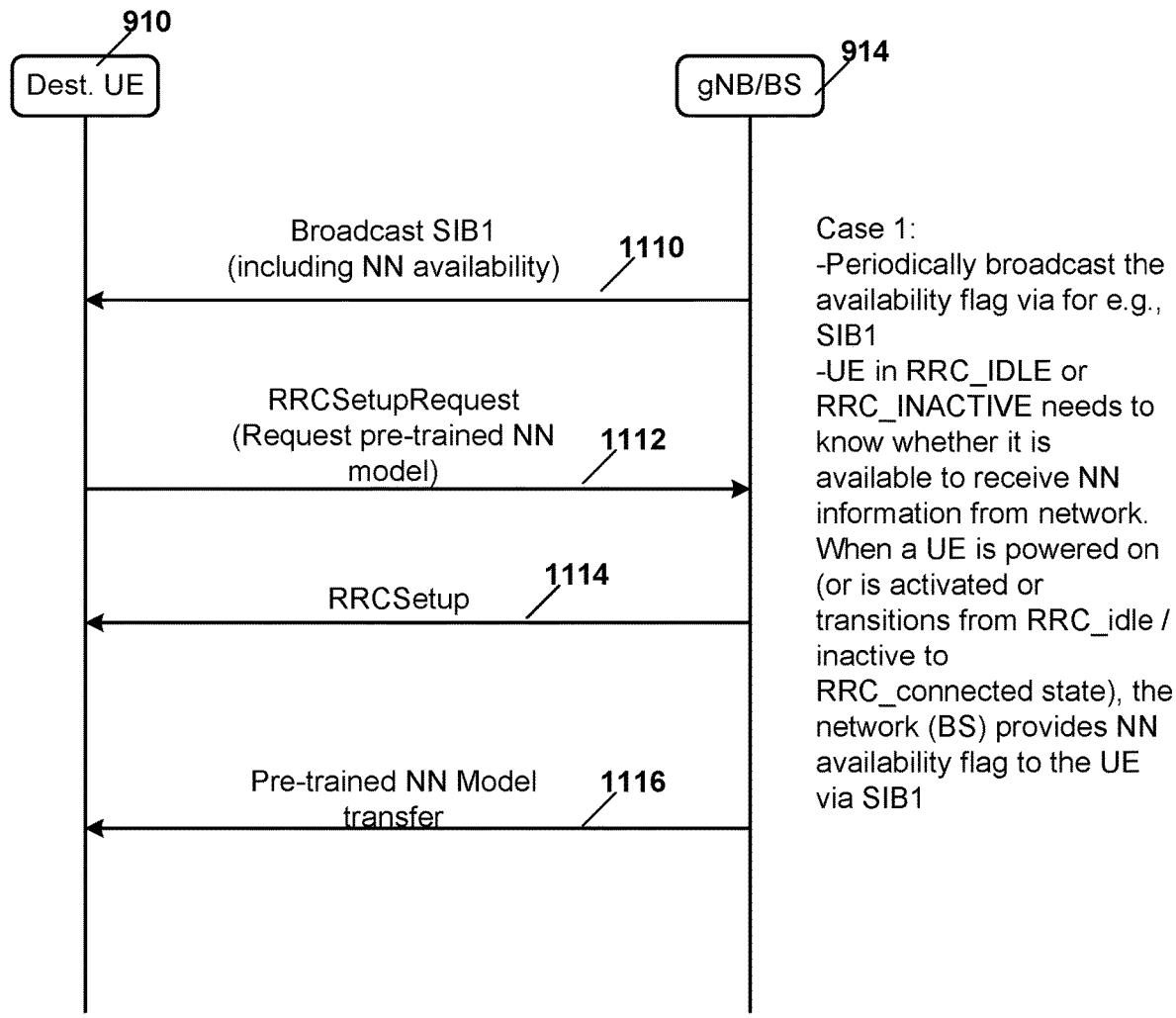
FIG. 11 is a diagram illustrating transfer of a pre-trained NN model to a UE that may be in an idle or inactive state.
Figure 12:
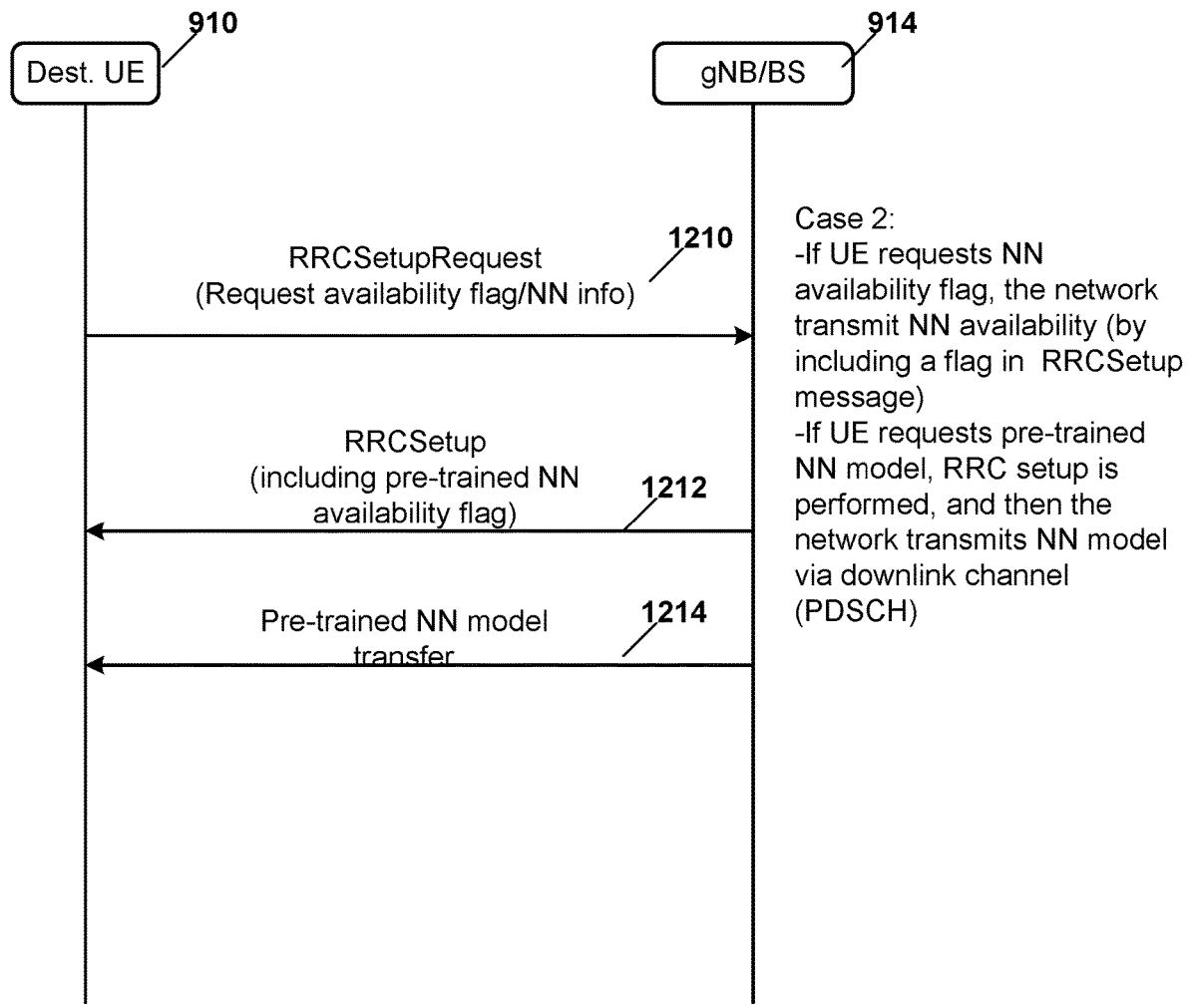
FIG. 12. is a diagram illustrating transfer of a pre-trained NN model to a UE according to another example embodiment.
Figure 13:
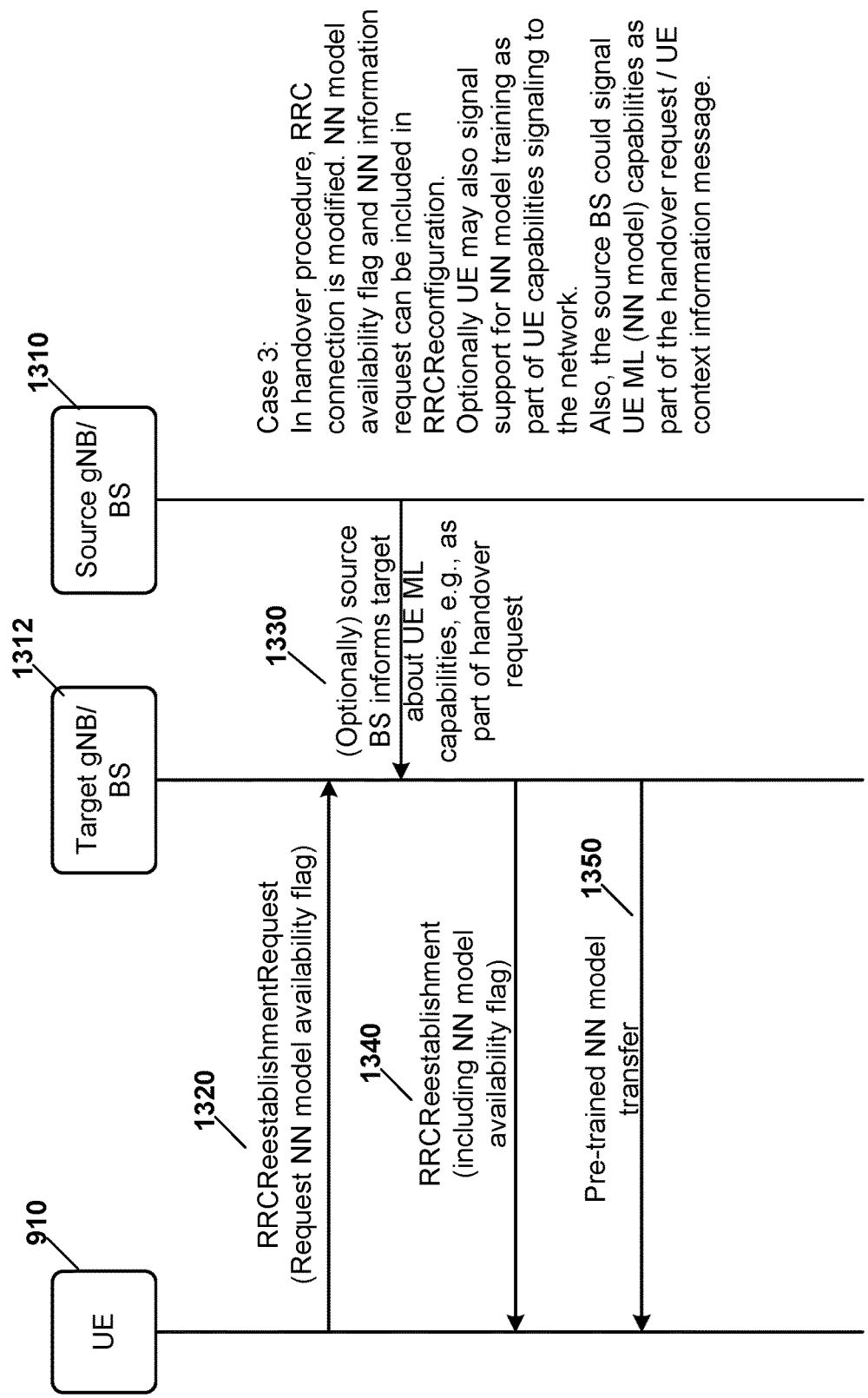
FIG. 13 is a diagram illustrating transfer of a pre-trained NN model to a UE according to another example embodiment.

FIGS. 11-13 illustrate some examples or use cases where a pre-trained NN model may be transferred to a destination UE. A RRCSetupRequest may typically be used by a UE to request transition to a connected state. However, the RRCSetupRequest and RRCSetup messages may, in some of these examples, instead be used to request and obtain NN model availability.

FIG. 11 is a diagram illustrating transfer of a pre-trained NN model to a UE that may be in an idle or inactive state. In this case, the inactive or idle UE may use RRCSetupRequest to request transmission of NN model availability indication, so that idle or inactive UE can determine whether it can obtain a pre-trained NN model from the gNB. At 1110, the gNB 914 may periodically broadcast the NN model availability indication or flag, e.g., via SIB 1. This may inform the idle or inactive state UE whether or not a pre-trained NN model is available at the gNB. At 1112, a UE 910 in idle or inactive state may send a RRCSetupRequest to the gNB (with a request for the pre-trained NN model). Thus, for example, this use of RRCSetupRequest may be used by an idle or inactive state UE to request and then obtain a pre-trained NN model. At 1114, the UE receives an RRCSetup message. At 1116, the UE receives the pre-trained NN model from the gNB.

FIG. 12. is a diagram illustrating transfer of a pre-trained NN model to a UE according to another example embodiment. At 1210, the UE may send a RRCSetupRequest, including a request of NN model availability and/or a request for the NN model. At 1212, the gNB may send the NN model availability indication or flag within a RRCSetup message. And, at 1214, the gNB may send the requested pre-trained NN model to the UE.

FIG. 13 is a diagram illustrating transfer of a pre-trained NN model to a UE according to another example embodiment. A destination UE 910, a source gNB 1310 and a target gNB 1312 are shown. In a handover procedure (to perform handover of UE from source gNB 1310 to target gNB 1312), RRC (radio resource control) connection is modified. NN availability flag and NN model request can be included in RRCReconfiguration. Optionally UE may also signal support for NN model training as part of UE capabilities signaling to the network. Also, the gNB may signal or indicate UE ML capabilities as part of the handover request/UE context information message. At 1320, the UE may send a RRCReestablishmentRequest to target gNB 1312, requesting NN model availability. At 1330, the source gNB 1310 may inform the target gNB 1312 about ML capabilities of UE 910 (e.g., capabilities of UE 910 to use a pre-trained NN model). Also, in some cases, UE capabilities, which may include ML/NN capabilities of the UE, may be exchanged before RRCReestablishment message is sent. At 1340, the UE 910 may receive from target gNB 1312 a RRCReestablishment (including NN availability flag or indication). At 1350, the UE 910 may obtain (e.g., as part of a handover procedure to target gNB) the pre-trained NN model from the target gNB 1312.

Example 1. A method comprising: receiving, by a first user device in a wireless network, an indication of availability of a pre-trained model that estimates a channel between a second user device and a network node; receiving, by the first user device, information relating to the pre-trained model; determining, by the first user device, channel estimation information based at least on the information relating to the pre-trained model; and performing at least one of the following: transmitting, by the first user device, a report to the network node including the channel estimation information; or receiving data, by the first user device from the network node, based on the channel estimation information.

Example 2. The method of example 1, wherein the pre-trained model comprises a pre-trained neural network model.

Example 3. The method of any of examples 1-2, wherein the performing comprises: transmitting, by the first user device, a report to the network node including the channel estimation information.

Example 4. The method of any of examples 1-3, wherein the performing comprises: receiving data, by the first user device from the network node, wherein one or more transmission parameters for the data are based on the channel estimation information.

Example 5. The method of any of examples 1-4, wherein the channel estimation information comprises at least one of: information estimating an amplitude and/or phase, or a change in amplitude and/or phase, associated with a channel; or a channel state information (CSI), including one or more of a channel quality indicator (CQI), a precoding matrix indicator (PMI), and/or a rank indicator (RI).

Example 6. The method of any of examples 2-5, wherein the receiving an indication of availability comprises at least one of: receiving, by the first user device from the network node via a system information block (SIB) transmission, an indication of availability of a pre-trained neural network model; or receiving, by the first user device from the network node, a dedicated message with an indication of availability of the pre-trained neural network model.

Example 7. The method of any of examples 1-6, wherein the receiving an indication of availability of a pre-trained model comprises: receiving, by the first user device, an indication of availability of a pre-trained neural network model that estimates a channel between the second user device and the network node, wherein the indication indicates at least one of a time of creating or a time of storage of the pre trained neural network model and/or a location of the second user device.

Example 8. The method of any of examples 1-7 wherein the receiving information relating to the pre-trained model comprises at least one of: receiving at least a portion of a pre-trained neural network model from the network node; receiving at least a portion of the pre-trained neural network model via sidelink communications or higher layer from the second user device; or receiving at least a portion of the pre-trained neural network model via inter-radio access technology (inter-RAT) communications.

Example 9. The method of any of examples 1-8, wherein the receiving information relating to the pre-trained model comprises: receiving, by the first user device, at least a plurality of weights or compressed weights for at least a portion of a pre-trained neural network model.

Example 10. The method of any of examples 1-9, wherein the receiving information relating to the pre-trained model comprises: receiving, by the first user device at least:
a plurality of weights or compressed weights for at least a portion of a pre-trained neural network model; and neural network model configuration information, including information indicating one or more types of activation functions of the pre-trained neural network model.

Example 11. The method of any of examples 1-10, wherein the receiving information relating to the pre-trained model comprises: transmitting, by the first user device, to either the second user device or the network node, a request for a pre-trained neural network model; and receiving, by the first user device, at least a portion of the pre-trained neural network model based on transmitting the request.

Example 12. The method of example 11, wherein the transmitting a request comprises: transmitting, by the first user device, to either the second user device or the network node, a request for the pre-trained neural network model, wherein the request includes a full/partial indication that indicates a request for either a full pre-trained neural network model, or a partial amount or portion of the pre-trained neural network model.

Example 13. The method of example 12, wherein the request indicates a requested portion or number or amount of layers of the pre-trained neural network model that is being requested.

Example 14. The method of any of examples 2-13, wherein the receiving the pre-trained neural network model comprises: receiving, by the first user device, at least a portion of the pre-trained neural network model during a procedure of the first user device to establish a connection to the network node.

Example 15. The method of example 14, wherein the receiving information relating to the pre-trained neural network model comprises: determining, by the first user device, at least one of a location of the first user device, or a current time; comparing, by the first user device, the location of the first user device and/or the current time to the time and/or location associated with the pre-trained neural network model; making a determination, based on the comparing, to obtain at least a portion of the pre trained neural network model or information relating to the pre-trained neural network model; transmitting a request to receive the pre-trained neural network model; and receiving, by the first user device, at least a portion of the pre-trained neural network model from either the network node or the second user device.

Example 16. A non-transitory computer-readable storage medium comprising instructions stored thereon that, when executed by at least one processor, are configured to cause a computing system to perform the method of any of examples 1-15.

Example 17. An apparatus comprising means for performing the method of any of examples 1-15.

Example 18. An apparatus comprising: at least one processor; and at least one memory including computer program code; the at least one memory and the computer program code configured to, with the at least one processor, cause the apparatus at least to perform the method of any of examples 1-15.

Example 19. An apparatus comprising: at least one processor; and at least one memory including computer program code; the at least one memory and the computer program code configured at least to: receive, by a first user device in a wireless network, an indication of availability of a pre-trained model that estimates a channel between a second user device and a network node; receive, by the first user device, information relating to the pre-trained model; determine, by the first user device, channel estimation information based at least on the information relating to the pre-trained model; and perform at least one of the following: transmit, by the first user device, a report to the network node including the channel estimation information; or receive data, by the first user device from the network node, based on the channel estimation information.

Example 20. A method comprising: determining, by a network node, that a pre-trained model, which estimates a channel between a first user device and the network node, is available at the network node or at a first user device; transmitting, by the network node, to one or more user devices, an indication of availability of the pre-trained model that estimates the channel between the first user device and the network node; receiving, by the network node from a second user device, a request for the pre-trained model; and transmitting, by the network node to the second user device, information relating to the pre-trained model.

Example 21. The method of example 20, wherein the pre-trained model comprises a pre-trained neural network model.

Example 22. The method of any of examples 20-21, wherein the determining that a pre-trained model is available comprises at least one of: generating, by the network node, a pre-trained neural network model, which estimates a channel between the first user device and the network node; receiving, by the network node from the first user device, at least a portion of a pre-trained neural network model, which estimates a channel between the first user device and the network node; or receiving, by the network node from the first user device, an indication that the first user device has available a pre-trained neural network model, which estimates a channel between the first user device and the network node.

Example 23. The method of any of examples 20-22, wherein the transmitting an indication of availability comprises at least one of: transmitting, by the network node to one or more user devices, including at least the second user device, via a system information block (SIB) transmission, an indication of availability of a pre-trained neural network model; or transmitting, by the network node to one or more user devices including at least the second user device, a dedicated message with an indication of availability of the pre-trained neural network model.

Example 24. The method of any of examples 20-23 wherein the transmitting, by the network node to the second user device, information relating to the pre-trained model, comprises: transmitting at least a plurality of weights for at least a portion of a pre-trained neural network model.

Example 25. The method of any of examples 20-24 wherein the transmitting, by the network node to the second user device, information relating to the pre-trained model, comprises: transmitting at least a plurality of weights for at least a portion of a pre-trained neural network model, and neural network model configuration information including information indicating one or more types of activation functions of the pre-trained neural network model.

Example 26. The method of any of examples 20-25, wherein the request for the pre-trained model includes a full/partial indication that indicates a request for either a full pre-trained neural network model, or a partial amount or portion of the pre-trained neural network model; wherein the transmitting information relating to the pre-trained model comprises at least one of: transmitting, by the network node to the second user device, only a portion of the pre-trained neural network model if the full/partial indication indicates a request for a partial amount or portion of the pre-trained neural network model; or transmitting, by the network node to the second user device, the full pre-trained neural network model if the full/partial indication indicates a request for a full pre-trained neural network model.

Example 27. The method of any of examples 20-26, wherein the transmitting at least a portion of the pre-trained model to the second user device is performed during a procedure of the second user device to establish a connection to the network node.

Example 28. A non-transitory computer-readable storage medium comprising instructions stored thereon that, when executed by at least one processor, are configured to cause a computing system to perform the method of any of examples 20-26.

Example 29. An apparatus comprising means for performing the method of any of examples 20-26.

Example 30. An apparatus comprising: at least one processor; and at least one memory including computer program code; the at least one memory and the computer program code configured to, with the at least one processor, cause the apparatus at least to perform the method of any of examples 20-26.

Example 31. An apparatus comprising: at least one processor; and at least one memory including computer program code; the at least one memory and the computer program code configured at least to: determine, by a network node, that a pre-trained model, which estimates a channel between a first user device and the network node, is available at the network node or at a first user device; transmit, by the network node, to one or more user devices, an indication of availability of a pre-trained model that estimates the channel between the first user device and the network node; receive, by the network node from a second user device, a request for the pre-trained model; and transmit, by the network node to the second user device, information relating to the pre-trained neural network model.

Example 32. A method comprising: transmitting, by a first user device to either a network node or a second user device, an indication of availability of a pre-trained model that estimates a channel between the first user device and the network node; receiving, by the first user device from either the network node or the second user device, a request for the pre-trained model; and transmitting, by the first user device to the network node via uplink communication or to the second user device via sidelink communications, in response to the request, information relating to the pre-trained model.

Example 33. The method of example 32, wherein the pre-trained model comprises a pre-trained neural network model.

Example 34. An apparatus comprising: at least one processor; and at least one memory including computer program code; the at least one memory and the computer program code configured at least to: transmit, by a first user device to either a network node or a second user device, an indication of availability of a pre-trained neural network model that estimates a channel between the first user device and the network node; receive, by the first user device from either the network node or the second user device, a request for the pre-trained neural network model; and transmit, by the first user device to the network node via uplink communication or to the second user device via sidelink communications, in response to the request, information relating to the pre-trained neural network model.

Figure 14:
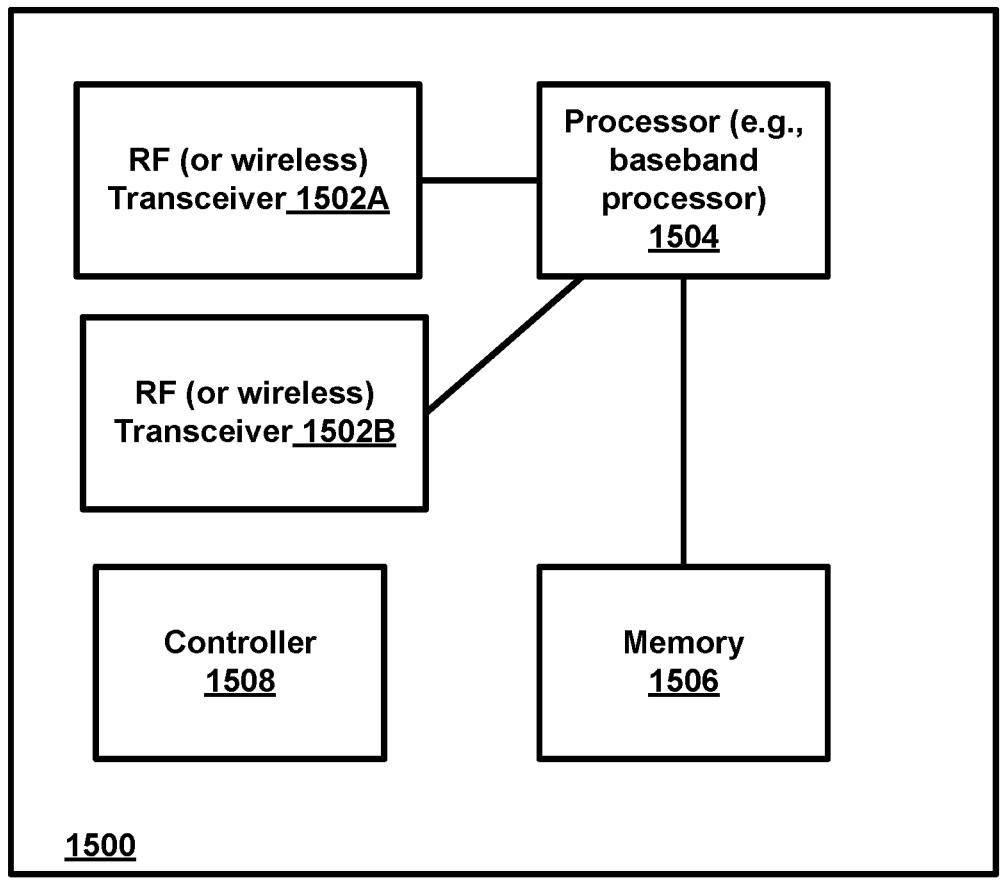
FIG. 14 is a block diagram of a wireless station or node (e.g., AP, BS, RAN node, DU, UE, CH or user device, or network node).

FIG. 14 is a block diagram of a wireless station (e.g., AP, BS or user device/UE, or other network node) 1500 according to an example embodiment. The wireless station 1500 may include, for example, one or more (e.g., two as shown in FIG. 14) RF (radio frequency) or wireless transceivers 1502A, 1502B, where each wireless transceiver includes a transmitter to transmit signals and a receiver to receive signals. The wireless station also includes a processor or control unit/entity (controller) 1504 to execute instructions or software and control transmission and receptions of signals, and a memory 1506 to store data and/or instructions.

Processor 1504 may also make decisions or determinations, generate frames, packets or messages for transmission, decode received frames or messages for further processing, and other tasks or functions described herein. Processor 1504, which may be a baseband processor, for example, may generate messages, packets, frames or other signals for transmission via wireless transceiver 1502 (1502A or 1502B). Processor 1504 may control transmission of signals or messages over a wireless network, and may control the reception of signals or messages, etc., via a wireless network (e.g., after being down-converted by wireless transceiver 1502, for example). Processor 1504 may be programmable and capable of executing software or other instructions stored in memory or on other computer media to perform the various tasks and functions described above, such as one or more of the tasks or methods described above. Processor 1504 may be (or may include), for example, hardware, programmable logic, a programmable processor that executes software or firmware, and/or any combination of these. Using other terminology, processor 1504 and transceiver 1502 together may be considered as a wireless transmitter/receiver system, for example.

In addition, referring to FIG. 14, a controller (or processor) 1508 may execute software and instructions, and may provide overall control for the station 1500, and may provide control for other systems not shown in FIG. 14, such as controlling input/output devices (e.g., display, keypad), and/or may execute software for one or more applications that may be provided on wireless station 1500, such as, for example, an email program, audio/video applications, a word processor, a Voice over IP application, or other application or software.

In addition, a storage medium may be provided that includes stored instructions, which when executed by a controller or processor may result in the processor 1504, or other controller or processor, performing one or more of the functions or tasks described above.

According to another example embodiment, RF or wireless transceiver(s) 1502A/1502B may receive signals or data and/or transmit or send signals or data. Processor 1504 (and possibly transceivers 1502A/1502B) may control the RF or wireless transceiver 1502A or 1502B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving, by a first user device in a wireless network, an indication of availability of a pre-trained neural network model that estimates a channel between a second user device and a network node;
sending, by the first user device, a request for the pre-trained neural network model;
receiving, by the first user device, information relating to the pre-trained neural network model;
training a neural network model of the first user device based on the information relating to the pre-trained neural network model;
determining, by the first user device, channel estimation information based on the trained neural network model of the first user device; and
performing at least one of the following:
transmitting, by the first user device, a report to the network node including the channel estimation information; or
receiving data, by the first user device from the network node, based on the channel estimation information.

2. The method of claim 1, wherein the performing comprises:
transmitting, by the first user device, a report to the network node including the channel estimation information.

3. The method of claim 1, wherein the performing comprises:
receiving data, by the first user device from the network node, wherein one or more transmission parameters for the data are based on the channel estimation information.

4. The method of claim 1, wherein the channel estimation information comprises at least one of:
information estimating an amplitude and/or phase, or a change in amplitude and/or phase, associated with a channel; or
a channel state information (CSI), including one or more of a channel quality indicator (CQI), a precoding matrix indicator (PMI), and/or a rank indicator (RI).

5. The method of claim 1, wherein the receiving an indication of availability comprises at least one of:
receiving, by the first user device from the network node via a system information block (SIB) transmission, an indication of availability of a pre-trained neural network model; or
receiving, by the first user device from the network node, a dedicated message with an indication of availability of the pre-trained neural network model.

6. The method of claim 1, wherein the receiving an indication of availability of a pre-trained model comprises:
receiving, by the first user device, an indication of availability of a pre-trained neural network model that estimates a channel between the second user device and the network node, wherein the indication indicates at least one of a time of creation or a time of storage of the pre-trained neural network model and/or a location of the second user device.

7. The method of claim 1 wherein the receiving information relating to the pre-trained neural network model comprises at least one of:
receiving at least a portion of the pre-trained neural network model from the network node;
receiving at least a portion of the pre-trained neural network model via sidelink communications or higher layer from the second user device; or
receiving at least a portion of the pre-trained neural network model via inter-radio access technology (inter-RAT) communications.

8. The method of claim 1, wherein the receiving information relating to the pre-trained neural network model comprises:
receiving, by the first user device, at least a plurality of weights or compressed weights for at least a portion of the pre-trained neural network model.

9. The method of claim 1, wherein the receiving information relating to the pre-trained neural network model comprises:
receiving, by the first user device, at least:
a plurality of weights or compressed weights for at least a portion of the pre-trained neural network model; and
neural network model configuration information, including information indicating one or more types of activation functions of the pre-trained neural network model.

10. The method of claim 1, wherein the receiving information relating to the pre-trained neural network model comprises:
transmitting, by the first user device, to either the second user device or the network node, a request for a pre-trained neural network model; and
receiving, by the first user device, at least a portion of the pre-trained neural network model based on transmitting the request.

11. The method of claim 10, wherein the transmitting a request comprises:
transmitting, by the first user device, to either the second user device or the network node, a request for the pre-trained neural network model, wherein the request includes a full/partial indication that indicates a request for either a full pre-trained neural network model, or a partial amount or portion of the pre-trained neural network model.

12. The method of claim 11, wherein the request indicates a requested portion or number or amount of layers of the pre-trained neural network model that is being requested.

13. The method of claim 1, wherein the receiving information relating to the pre-trained neural network model comprises:
receiving, by the first user device, information relating to the pre-trained neural network model during a procedure of the first user device to establish a connection to the network node.

14. The method of claim 13, wherein the receiving information relating to the pre-trained neural network model comprises:
determining, by the first user device, a current time;
comparing, by the first user device, the current time to the time associated with the pre-trained neural network model;
making a determination, based on the comparing, to obtain at least a portion of the pre-trained neural network model or information relating to the pre-trained neural network model;
transmitting a request to receive the pre-trained neural network model; and
receiving, by the first user device, at least a portion of the pre-trained neural network model from either the network node or the second user device.

15. The method of claim 1, wherein training the neural network model of the first user device includes training one or more unshared layers of the neural network model of the first user device based on the information relating to the pre-trained neural network model.

16. An apparatus comprising:
  at least one processor; and
  at least one memory including computer program code;
  the at least one memory and the computer program code configured at least to:
    receive, by a first user device in a wireless network, an indication of availability of a pre-trained neural network model that estimates a channel between a second user device and a network node;
    receive, by the first user device, information relating to the pre-trained neural network model during a procedure of the first user device to establish a connection to the network node, the receiving the information relating to the pre-trained neural network model comprising:
      determining, by the first user device, a current time;
      comparing, by the first user device, the current time to the time associated with the pre-trained neural network model;
      making a determination, based on the comparing, to obtain at least a portion of the pre-trained neural network model or information relating to the pre-trained neural network model;
      transmitting a request to receive the pre-trained neural network model; and
      receiving, by the first user device, at least a portion of the pre-trained neural network model from either the network node or the second user device;
    determine, by the first user device, channel estimation information based at least on the information relating to the pre-trained model; and
    perform at least one of the following:
      transmit, by the first user device, a report to the network node including the channel estimation information; or
      receive data, by the first user device from the network node, based on the channel estimation information.

17. The apparatus of claim 16, wherein the receiving an indication of availability comprises at least one of:
  receiving, by the first user device from the network node via a system information block (SIB) transmission, an indication of availability of the pre-trained neural network model; or
  receiving, by the first user device from the network node, a dedicated message with an indication of availability of the pre-trained neural network model.

18. A method comprising:
  determining, by a network node, that a pre-trained neural network model, which estimates a channel between a first user device and the network node, is available at the network node or at a first user device;
  transmitting, by the network node, to one or more user devices, an indication of availability of the pre-trained neural network model that estimates the channel between the first user device and the network node;
  receiving, by the network node from a second user device, a request for the pre-trained neural network model; and
  transmitting, by the network node to the second user device, weights for a plurality of layers of the pre-trained neural network model.

19. The method of claim 18, wherein the determining that a pre-trained model is available comprises at least one of:
  generating, by the network node, a pre-trained neural network model, which estimates a channel between the first user device and the network node;
  receiving, by the network node from the first user device, at least a portion of a pre-trained neural network model, which estimates a channel between the first user device and the network node; or
  receiving, by the network node from the first user device, an indication that the first user device has available a pre-trained neural network model, which estimates a channel between the first user device and the network node.

20. The method of claim 18 wherein the transmitting, by the network node to the second user device, information relating to the pre-trained neural network model, comprises:
  transmitting at least a plurality of weights for at least a portion of the pre-trained neural network model, and neural network model configuration information including information indicating one or more types of activation functions of the pre-trained neural network model.

21. The method of claim 18, wherein the request for the pre-trained neural network model includes a full/partial indication that indicates a request for either a full pre-trained neural network model, or a partial amount or portion of the pre-trained neural network model;
  wherein the transmitting weights for the plurality of layers of the pre-trained neural network model comprises at least one of:
    transmitting, by the network node to the second user device, weights for only a portion of layers of the pre-trained neural network model if the full/partial indication indicates a request for a partial amount or portion of the pre-trained neural network model; or
    transmitting, by the network node to the second user device, the full weights for all of the layers of the pre-trained neural network model if the full/partial indication indicates a request for a full pre-trained neural network model.

22. A method comprising:
  receiving, by a first user device in a wireless network, an indication of availability of a pre-trained neural network model that estimates a channel between a second user device and a network node;
  sending, by the first user device, a request for the pre-trained neural network model;
  receiving, by the first user device, a time associated with the pre-trained neural network model;
  determining, by the first user device, a current time;
  comparing, by the first user device, the current time to the time associated with the pre-trained neural network model;
  determining, by the first user device based on the comparing, information relating to the pre-trained neural network model;
  determining, by the first user device, channel estimation information based at least on the information relating to the pre-trained model; and
  performing, by the first user device, at least one of the following:
    transmitting, by the first user device, a report to the network node including the channel estimation information; or
    receiving data, by the first user device from the network node, based on the channel estimation information.

23. The method of claim 22, wherein the receiving an indication of availability comprises at least one of:
 receiving, by the first user device from the network node via a system information block (SIB) transmission, an indication of availability of the pre-trained neural network model; or
 receiving, by the first user device from the network node, a dedicated message with an indication of availability of the pre-trained neural network model.

24. The method of claim 22, wherein the receiving an indication of availability of the pre-trained neural network model comprises:
 receiving, by the first user device, an indication of availability of the pre-trained neural network model that estimates a channel between the second user device and the network node, wherein the indication indicates at least one of a time of creation or a time of storage of the pre-trained neural network model and/or a location of the second user device.

* * * * *